US012613480B2

(12) United States Patent
Taniguchi et al.

(10) Patent No.: US 12,613,480 B2
(45) Date of Patent: Apr. 28, 2026

(54) IMAGE FORMING APPARATUS WITH CHARGING CURRENT DETECTOR

(71) Applicant: CANON KABUSHIKI KAISHA, Tokyo (JP)

(72) Inventors: Hisashi Taniguchi, Shizuoka (JP); Issei Imamura, Shizuoka (JP); Takuya Oka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/806,428

(22) Filed: Aug. 15, 2024

(65) Prior Publication Data

US 2025/0278035 A1 Sep. 4, 2025

(30) Foreign Application Priority Data

Aug. 23, 2023 (JP) ................................ 2023-135936

(51) Int. Cl.

| | |
|---|---|
| ***G03G 15/00*** | (2006.01) |
| ***G03G 15/02*** | (2006.01) |
| ***G03G 15/043*** | (2006.01) |
| ***G03G 15/045*** | (2006.01) |
| ***G03G 15/06*** | (2006.01) |
| ***G03G 15/08*** | (2006.01) |

(52) U.S. Cl.

CPC ....... *G03G 15/0266* (2013.01); *G03G 15/043* (2013.01); *G03G 15/045* (2013.01); *G03G 15/065* (2013.01); *G03G 15/0806* (2013.01); *G03G 15/0856* (2013.01); *G03G 15/0865* (2013.01); *G03G 15/5004* (2013.01)

(58) Field of Classification Search

CPC ............ G03G 15/0266; G03G 15/043; G03G 15/045; G03G 15/065; G03G 15/0806; G03G 15/0856; G03G 15/0865; G03G 15/5004; G03G 21/14

See application file for complete search history.

(56) References Cited

U.S. PATENT DOCUMENTS 11,726,415 B2 * 8/2023 Nagatomo ......... G03G 15/0266 399/50
2009/0169227 A1 * 7/2009 Kanai ................ G03G 15/0266 399/128

FOREIGN PATENT DOCUMENTS

| | | | |
|---|---|---|---|
| JP | H06186815 | A | 7/1994 |
| JP | H08146677 | A | 6/1996 |
| JP | 2000029282 | A | 1/2000 |
| JP | 2010197464 | A | 9/2010 |
| JP | 2016038591 | A | 3/2016 |
| JP | 2020052370 | A | 4/2020 |

* cited by examiner

*Primary Examiner* — Sophia S Chen

(74) *Attorney, Agent, or Firm* — Canon U.S.A., Inc., IP Division

(57) ABSTRACT

Disclosed is a controller for controlling a charging current detector to perform a detection operation to detect charging current while a surface of a photosensitive member having passed through the development portion after being charged by the charger passes through the charging portion during a non-image forming operation, and for controlling at least one of a charging voltage applicator, an exposer, and a development voltage applicator to change a development contrast based on a charging current value detected by a previous detection operation and a charging current value detected by a current detection operation.

16 Claims, 13 Drawing Sheets

IMAGE FORMING APPARATUS WITH CHARGING CURRENT DETECTOR

BACKGROUND

Field

The present disclosure relates to an image forming apparatus, such as a copy machine, a printer, or a facsimile, that forms images using an electrophotographic or electrostatic recording method.

Description of the Related Art

In a conventional image forming apparatus that uses, for example, an electrophotographic method, an electrostatic latent image is formed on a photosensitive member (electrophotographic photosensitive member) serving as an image bearing member, and toner is supplied to the electrostatic latent image by a development device to form a toner image on the photosensitive member. The toner image formed on the photosensitive member is transferred onto a recording material directly or via an intermediate transfer member, and an image is formed on the recording material.

The development device may be configured as a development cartridge that is attachable to and detachable from a body (hereinafter, sometimes referred to simply as "apparatus body") of the image forming apparatus independently, or as a process cartridge that is attachable to and detachable from the apparatus body together with another process unit.

Image failure can occur due to lack of monitoring the state of the toner in the development device in the image forming apparatus. For example, it has been found that in a case where an external development device has been replenished with new toner, an image failure, such as dilution or banding, may occur due to a change in charging characteristics of the toner.

For example, in a case where the development device has been replenished with new toner and charging characteristics of the toner has been increased in the development device, the amount of charge per toner particle increases, which results in a decrease in the number of toner particles to be used to fill the latent image electric potential. This may be visualized as dilution (phenomenon of a decrease in image density). With an increase in charging characteristics of the toner, frictional charging between the photosensitive member and the toner at the development portion facilitates movement of the charge on the surface of the photosensitive member to the toner, and the surface potential of the photosensitive member decreases. With a variation (change in amount of entry) in an outer diameter of a development roller serving as a development member of the development device, it becomes more susceptible to the effects of the variation (change in amount of entry) in the outer diameter of the development roller, and this is often visualized as banding, which is uneven development that occurs at a rotation period of the development roller. This can be due to the following reasons. Specifically, a force that presses the toner against the photosensitive member is greater in a case where the amount of entry of the development roller into the photosensitive member is great than in a case where the amount of entry is small, and frictional charging force between the photosensitive member and the toner increases. Consequently, the movement of the charge on the photosensitive member to the toner is further facilitated. Thus, a technique for determining the state of the toner in the development device and changing to an optimum control is desired.

Japanese Patent Application Laid-Open No. 2010-197464 discusses a technique for detecting a toner current flowing between a development roller and an opposing member. In the technique discussed in Japanese Patent Application Laid-Open No. 2010-197464, a toner current that is generated by reciprocating motion of toner between the development roller and the opposing member due to an alternating-current voltage applied between the development roller and the opposing member placed opposite the development roller without being in contact with the development roller is detected. In this process, a capacitor is connected in parallel with the development roller and the opposing member to offset charge and discharge currents flowing between the development roller and the opposing member so that only the toner current is detected. Then, feedback to image forming conditions such as a development voltage is provided based on the toner current detection results.

With the technique discussed in Japanese Patent Application Laid-Open No. 2010-197464, however, a new alternating-current voltage power supply needs to be installed in a case where, for example, a power supply of an image forming unit is composed of a direct-current (DC) voltage power supply. With the technique discussed in Japanese Patent Application Laid-Open No. 2010-197464, a new circuit for measuring the toner current may be configured.

SUMMARY

The present disclosure is directed to preventing image failures due to a change in charging characteristics of toner in a development device by detecting the change in the charging characteristics of the toner in the development device with a simple configuration.

An aspect of the present disclosure provides an image forming apparatus includes a photosensitive member configured to rotate; a charger configured to contact the photosensitive member to form a charging portion and charge a surface of the photosensitive member being rotated; a charging voltage applicator configured to apply a charging voltage to the charger, an exposer configured to expose the surface of the photosensitive member charged by the charger and form an electrostatic latent image on the surface of the photosensitive member, a development member configured to rotate, form a development portion where a developer is supplied to the surface of the photosensitive member, and form a developer image on the surface of the photosensitive member by supplying the developer charged to a predetermined polarity to the electrostatic latent image on the surface of the photosensitive member at the development portion; a development voltage applicator configured to apply, to the development member, a development voltage on the predetermined polarity with respect to a potential of the electrostatic latent image at the development portion; a charging current detector configured to detect a charging current flowing through the charging portion during the charging of the surface of the photosensitive member by the charger; and a controller configured to control the charging voltage applicator, the exposer, and the development voltage applicator. The controller is configured to control an image forming operation in which the developer image is formed on the surface of the photosensitive member, and a non-image forming operation in which the developer image is not formed on the surface of the photosensitive member. The controller is also configured to communicate with the charging current detector during at least one detection operation for detection of the charging current while the surface of the photosensitive member having passed through the development portion after being charged by the charger passes through the charging portion during the non-image forming operation The controller is further configured to control at least one of the charging voltage applicator, the exposer, and the development voltage applicator to change a development contrast based on a charging current value $I_A$ detected by a detection operation that is performed before a current detection operation and a charging current value $I_B$ detected by the current detection operation, the development contrast being a difference between a voltage of the electrostatic latent image at the development portion and the development voltage.

Another aspect of the present disclosure provides an image forming apparatus includes a photosensitive member configured to rotate; a charger configured to contact the photosensitive member to form a charging portion and charge a surface of the photosensitive member being rotated; a charging voltage applicator configured to apply a charging voltage to the charger; an exposer configured to expose the surface of the photosensitive member charged by the charger and form an electrostatic latent image on the surface of the photosensitive member; a development member configured to rotate, form a development portion where a developer is supplied to the surface of the photosensitive member, and form a developer image on the surface of the photosensitive member by supplying the developer to the electrostatic latent image on the surface of the photosensitive member at the development portion; a speed regulator configured to change a rotation speed of the development member; a charging current detector configured to detect a charging current flowing through the charging portion during the charging of the surface of the photosensitive member by the charger, and a controller configured to control the charging voltage applicator and the speed regulator. The controller is configured to control to perform an image forming operation in which the developer image is formed on the surface of the photosensitive member, and a non-image forming operation in which the developer image is not formed on the surface of the photosensitive member. The controller is also configured to communicate with the charging current detector during at least one detection operation for detection of the charging current while the surface of the photosensitive member having passed through the development portion after being charged by the charger passes through the charging portion during the non-image forming operation. The controller is also configured to control the speed regulator to change a circumferential speed ratio of a circumferential speed of the development member to a circumferential speed of the photosensitive member, based on a charging current value $I_A$ detected by a detection operation that is performed before a current detection operation and a charging current value $I_B$ detected by the current detection operation.

Further features of the present disclosure will become apparent from the following description of embodiments with reference to the attached drawings.

DESCRIPTION OF THE EMBODIMENTS

Image forming apparatuses according to various embodiments will be described in more detail below with reference to the drawings. For convenience, unless otherwise specified, magnitudes (levels) of voltages or potentials are based on the absolute values of the voltages or potentials.

<Overall Configuration of Image Forming Apparatus>

Figure 1:
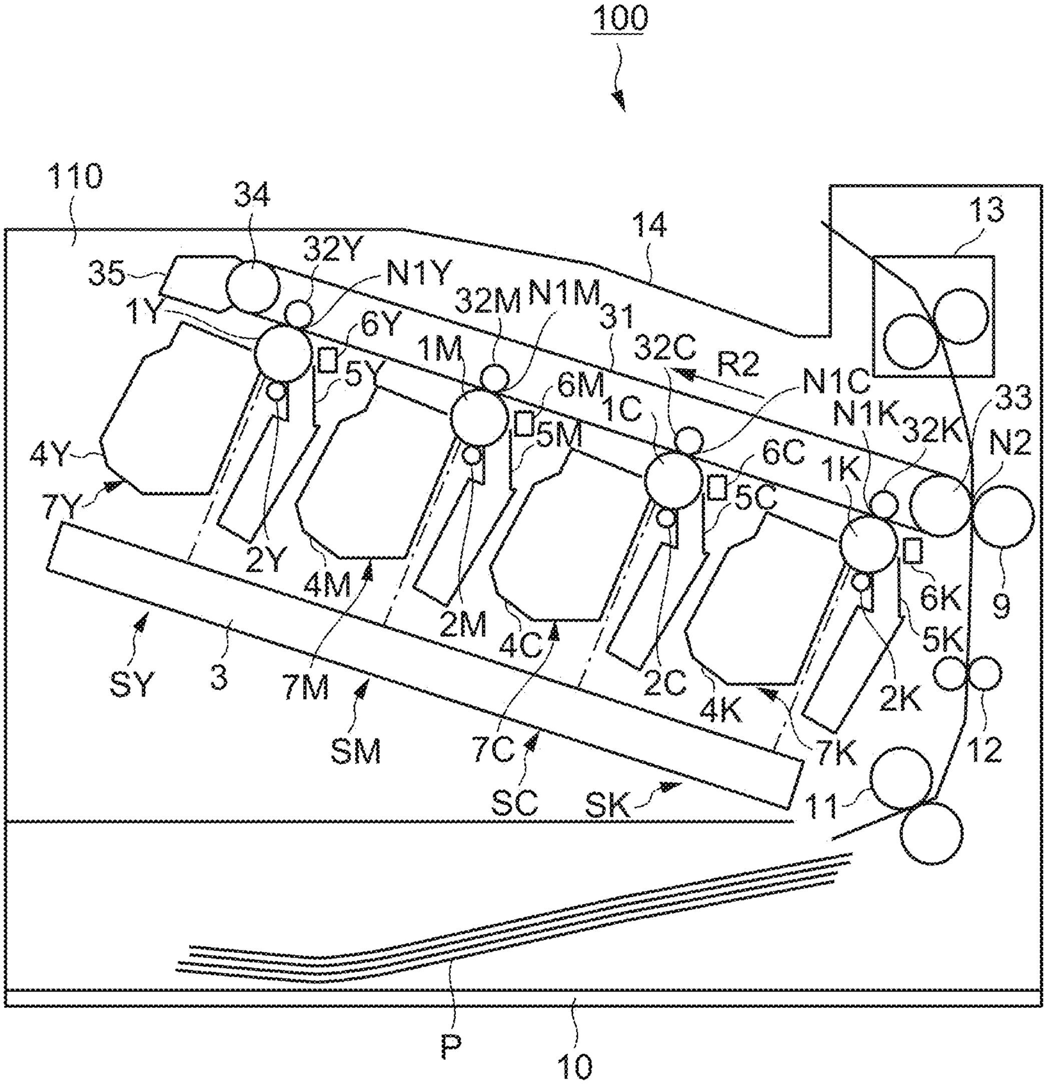
FIG. 1 is a schematic cross-sectional view illustrating an image forming apparatus according to a first embodiment.

First, an overall configuration of an image forming apparatus according to an embodiment of the present disclosure will be described below. FIG. 1 is a schematic cross-sectional view illustrating an image forming apparatus 100. The image forming apparatus 100 may be a full-color laser printer using an inline method and an intermediate transfer method. The image forming apparatus 100 is capable of forming full-color images on sheet-shaped recording materials P (e.g., recording sheet, plastic sheet, cloth) based on image information. The image information is input to the image forming apparatus 100 from an external apparatus, such as an image reading apparatus or a personal computer, connected to the image forming apparatus 100 to communicate with the image forming apparatus 100.

Figure 2:
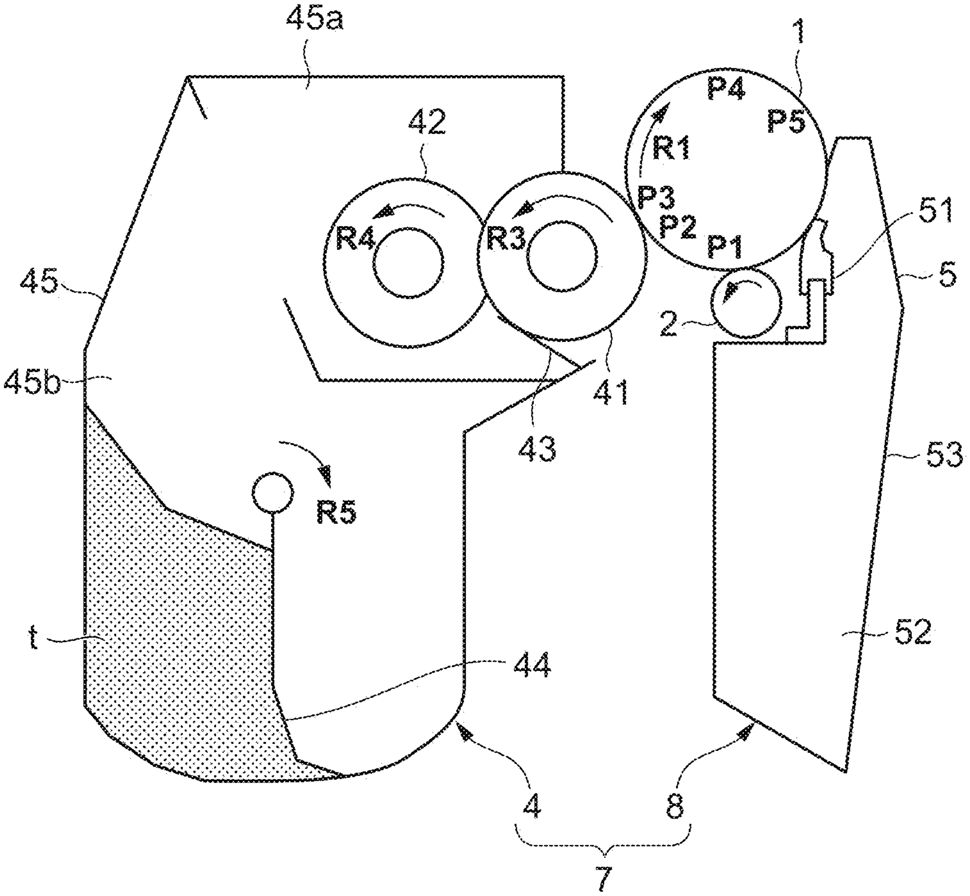
FIG. 2 is a schematic cross-sectional view illustrating a process cartridge according to the first embodiment.

The image forming apparatus 100 includes, as a plurality of image forming units, a first image forming unit SY, a second image forming unit SM, a third image forming unit SC, and a fourth image forming unit SK for forming yellow (Y), magenta (M), cyan (C), and black (K) images, respectively. Identical or corresponding components for different colors will sometimes be described collectively without the letters Y, M, C, and K at the end of each reference numeral. According to the present embodiment, the image forming unit S includes a photosensitive member 1, a charging roller 2, an exposer (exposure device) 3, a development device 4, a cleaning device 5, and a pre-exposure device 6, which will be described below. While the exposer 3 according to the present embodiment is formed as a single unit configured to expose the photosensitive member 1 of the image forming unit S, the exposer 3 may be disposed separately from the image forming unit S. In the image forming unit S, the photosensitive member 1, the charging roller 2 serving as a process unit configured to act on the photosensitive member 1, the development device 4, and the cleaning device 5 are integrated into a process cartridge 7. FIG. 2 is a schematic cross-sectional view illustrating one representative process cartridge 7.

The photosensitive member (photosensitive drum) 1 is an image bearing member configured to bear electrostatic latent images and toner images and having the shape of a rotary drum (cylindrical shape) and is driven to rotate in an arrow R1 direction (clockwise direction) in FIG. 2 by a driving force transmitted from a driver 80 (FIG. 3) serving as a drive unit. According to the present embodiment, the four photosensitive members 1 are aligned in a direction intersecting a vertical direction.

A surface of the rotating photosensitive member 1 is charged to a predetermined potential of a predetermined polarity (negative polarity according to the present embodiment) by the charging roller 2 being a roller-shaped charger serving as a charging unit. According to the present embodiment, the charging roller 2 is a single-layer roller including a conductive core metal and a conductive rubber layer (elastic layer) around the core metal and having an outer diameter of 7.5 mm and a volume resistivity of $10^3$ Ω·cm to $10^6$ Ω·cm. The charging roller 2 is in contact with the surface of the photosensitive member 1, is pressed against the photosensitive member 1, and is driven to rotate as the photosensitive member 1 rotates. During image forming (during charging processing), a predetermined charging voltage (charging bias) is applied to the charging roller 2 by a charging power supply (high-voltage power supply) 71 (FIG. 3) serving as a charging voltage applicator. The predetermined charging voltage is a DC voltage of a predetermined polarity (negative polarity according to the present embodiment). According to the present embodiment, a charging voltage of −1000 V is applied to the charging roller 2 to uniformly charge the surface of the photosensitive member 1 to −500 V. Specifically, a charging voltage Vd+Vth, which is a DC voltage, is applied to the charging roller 2, and the surface of the photosensitive member 1 is uniformly charged to Vd by discharge. As used herein, Vd refers to a dark-area potential (non-image portion potential), and according to the present embodiment, Vd is −500 V. Vth refers to a discharge start voltage, and according to the present embodiment, Vth is −500 V. In a case where the charging voltage applied to the charging roller 2 is low, the surface potential on the photosensitive member 1 does not increase due to discharge, whereas in a case where the charging voltage applied to the charging roller 2 is higher than or equal to the discharge start voltage Vth, the surface potential of the photosensitive member 1 starts to increase due to discharge. A charging portion (charging position) P1 is a position where the charging roller 2 charges the surface of the photosensitive member 1 in a rotation direction of the photosensitive member 1. According to the present embodiment, the surface of the photosensitive member 1 is charged by discharge occurring in minute gaps formed upstream and downstream of a contact portion between the photosensitive member 1 and the charging roller 2 in the rotation direction of the photosensitive member 1. However, for convenience, the contact portion between the photosensitive member 1 and the charging roller 2 may be considered as the charging portion P1.

The charged surface of the photosensitive member 1 is scanned and exposed by the exposer 3 as an exposure unit, and an electrostatic latent image (electrostatic image) is formed on the photosensitive member 1. The exposer 3 irradiates the surface of the photosensitive member 1 with laser light based on image information and forms an electrostatic latent image on the photosensitive member 1. The surface potential on the surface of the photosensitive member 1 irradiated with the laser light changes to −100 V, which is a light-area potential (image portion potential) Vl. A position where the exposer 3 irradiates the surface of the photosensitive member 1 with light in the rotation direction of the photosensitive member 1 is an exposure portion (exposure position) P2.

The electrostatic latent image formed on the photosensitive member 1 is developed (visualized) with toner serving as a developing agent supplied by the development device 4 serving as a development unit, and a toner image (toner image, developer image) is formed on the photosensitive member 1. The development device 4 includes a development roller 41 serving as a development member (developer bearing member). During image forming (during developing), a predetermined development voltage (development bias) is applied to the development roller 41 by a development power supply (high-voltage power supply) 72 (FIG. 3) serving as a development voltage applicator. The predetermined development voltage is a DC voltage of a predetermined polarity (negative polarity according to the present embodiment). According to the present embodiment, a development voltage Vdc of −300 V is applied to the development roller 41, whereby the toner adheres to the Vl portion on the photosensitive member 1. As described above, according to the present embodiment, the toner charged to the same polarity (negative polarity according to the present embodiment) as the charging polarity of the photosensitive member 1 adheres to an image portion on the photosensitive member 1 with decreased potential due to exposure following uniform charging (reversal development method). According to the present embodiment, a normal charging polarity of the toner during development, which is a major charging polarity of the toner, is the negative polarity. The development device 4 will be described further below. A development portion (development position) P3 is a position (contact portion between the photosensitive member 1 and the development roller 41 according to the present embodiment) where the development device 4 supplies the toner to the surface of the photosensitive member 1 in the rotation direction of the photosensitive member 1.

An intermediate transfer belt 31 as an intermediate transfer member of an endless belt is disposed opposite to the four photosensitive members 1. The intermediate transfer belt 31 is stretched over a drive roller 33 and a tension roller 34 serving as a plurality of stretching rollers and is tensioned with a predetermined tension. As the drive roller 33 is driven to rotate by a driving force transmitted from the driver 80 (FIG. 3) serving as a drive unit, the intermediate transfer belt 31 is rotated (circulating movement, cyclic movement) in an arrow R2 direction (anti-clockwise direction) in FIG. 1. On the inner peripheral surface side of the intermediate transfer belt 31, a primary transfer roller 32 is disposed opposite to the photosensitive member 1 via the intermediate transfer belt 31. The primary transfer roller 32 is a roller-type primary transfer member serving as a primary transfer unit. The primary transfer roller 32 is pressed against the photosensitive member 1 and brought into contact with the photosensitive member 1 via the intermediate transfer belt 31, and a primary transfer portion (primary transfer nip) N1 where the photosensitive member 1 and the intermediate transfer belt 31 are in contact with each other is formed. At the primary transfer portion N1, a toner image formed on the photosensitive member 1 is transferred (primary transfer) onto the rotating intermediate transfer belt 31 serving as a transfer recipient member by the action of the primary transfer roller 32. During image forming (during primary transfer), a predetermined primary transfer voltage (primary transfer bias) is applied to the primary transfer roller 32 by a primary transfer power supply (high-voltage power supply) 73 (FIG. 3) serving as a primary transfer voltage applicator. The predetermined primary transfer voltage is a DC voltage of the opposite polarity (positive polarity according to the present embodiment) to the normal charging polarity of the toner. For example, during full-color image forming, yellow (Y), magenta (M), cyan (C), and black (K) toner images formed on the photosensitive members 1 are sequentially transferred onto the intermediate transfer belt 31 and overlaid. A primary transfer position P4 (the primary transfer portion N1 according to the present embodiment, which is the contact portion between the photosensitive member 1 and the intermediate transfer belt 31) is a position where a toner image is transferred from the surface of the photosensitive member 1 onto the intermediate transfer belt 31 in the rotation direction of the photosensitive member 1.

On the outer peripheral surface side of the intermediate transfer belt 31, a secondary transfer roller 9 is disposed opposite to the drive roller 33 serving also as an opposing secondary transfer roller. The secondary transfer roller 9 is a roller-type secondary transfer member serving as a secondary transfer unit. The secondary transfer roller 9 is pressed against the drive roller 33 and brought into contact with the drive roller 33 via the intermediate transfer belt 31, and a secondary transfer portion (secondary transfer nip) N2 where the intermediate transfer belt 31 and the secondary transfer roller 9 are in contact with each other is formed. At the secondary transfer portion N2, a toner image formed on the intermediate transfer belt 31 is transferred (secondary transfer) onto a recording material P, serving as a transfer recipient member, being held and conveyed by the intermediate transfer belt 31 and the secondary transfer roller 9.

During image forming (during secondary transfer), a predetermined secondary transfer voltage (secondary transfer bias) is applied to the secondary transfer roller 9 by a secondary transfer power supply (high-voltage power supply) 74 (FIG. 3) serving as a secondary transfer voltage applicator. The predetermined secondary transfer voltage is a DC voltage of the opposite polarity (positive polarity according to the present embodiment) to the normal charging polarity of the toner. The recording material (transfer material, recording medium, sheet) P is stored in a cassette 10 serving as a recording material storage portion and is fed from the cassette 10 by feed rollers 11 serving as a feed member and conveyed to registration rollers 12 serving as a conveyance member. The recording material P is conveyed to the secondary transfer portion N2 in synchronization with the toner images on the intermediate transfer belt 31 by the registration rollers 12.

The recording material P on which the toner images have been transferred is conveyed to a fixing device 13 serving as a fixing unit. The fixing device 13 applies heat and pressure to the recording material P bearing the unfixed toner images to fix (fuse, solidify) the toner images onto the recording material P. The recording material P on which the toner images have been fixed is ejected (output) to a tray 14 serving as an ejection portion disposed outside a body 110 of the image forming apparatus 100.

Meanwhile, the surface potential of the photosensitive member 1 after the transfer of the toner images to the intermediate transfer belt 31 has become uneven due to being subjected to the primary transfer voltage. The pre-exposure device 6 serving as a static elimination unit performs pre-exposure (full-surface exposure, full-surface light irradiation) on the surface of the photosensitive member 1, whereby the surface potential of the photosensitive member 1 that has become uneven due to the previous image forming is uniformly leveled. Specifically, the pre-exposure removes residual charge on the surface of the photosensitive member 1. The pre-exposure device 6 exposes the surface of the photosensitive member 1 that is downstream of the primary transfer position P4 and upstream of the charging portion P1 in the rotation direction of the photosensitive member 1. As a light source of the pre-exposure device 6, a light emitting diode (LED) or a halogen lamp may be used. While any light source may be used, it is desirable to use an LED due to its low drive voltage and the ease of reducing the size of the apparatus. According to the present embodiment, an LED is used as a light source of the pre-exposure device 6. A pre-exposure portion (pre-exposure position) P5 is a position where the pre-exposure device 6 irradiates the surface of the photosensitive member 1 with light in the rotation direction of the photosensitive member 1.

The toner (primary transfer residual toner) that has not been transferred onto the intermediate transfer belt 31 and remains on the surface of the photosensitive member 1 is removed from the surface of the photosensitive member 1 and collected by the cleaning device 5 serving as a photosensitive member cleaning unit. The cleaning device 5 scrapes off the transfer residual toner from the surface of the rotating photosensitive member 1 with a cleaning blade 51 being in contact with the surface of the photosensitive member 1 and serving as a cleaning member and stores the transfer residual toner in a waste toner storage chamber 52 disposed below the cleaning blade 51.

Adhering substances, such as residual toner (secondary transfer residual toner), that have not been transferred onto the recording material P and remain on a surface of the intermediate transfer belt 31 are removed from the surface of the intermediate transfer belt 31 and collected by a belt cleaning device 35 serving as an intermediate transfer member cleaning unit.

Figure 3:
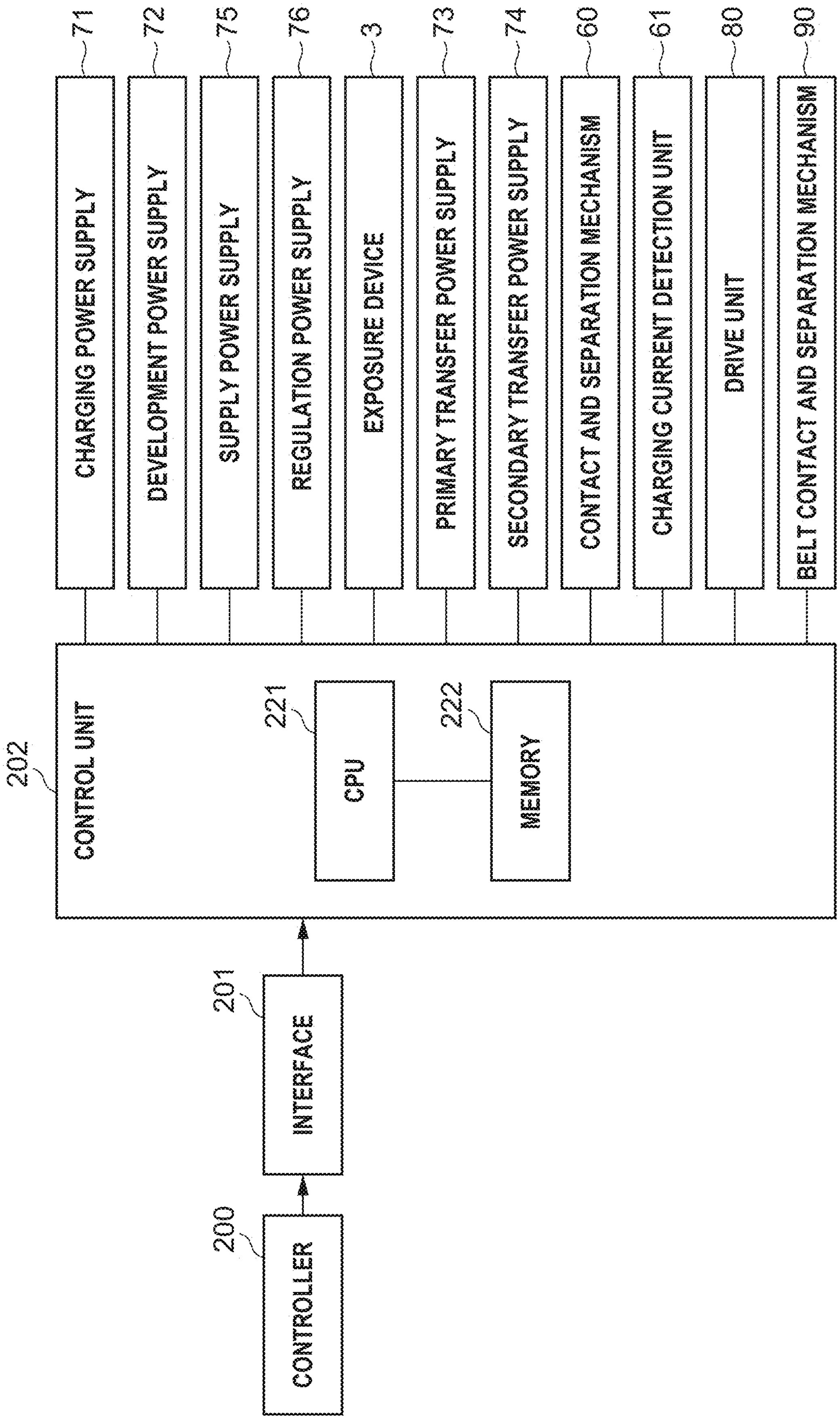
FIG. 3 is a block diagram illustrating a control configuration of the image forming apparatus according to the first embodiment.

The intermediate transfer belt 31 is brought into contact with and separated from each photosensitive member 1 by a belt contact and separation mechanism 90 (FIG. 3). According to the present embodiment, the belt contact and separation mechanism 90 separates the photosensitive member 1 from the intermediate transfer belt 31 by moving the primary transfer roller 32 away from the photosensitive member 1 and brings the intermediate transfer belt 31 into contact with the photosensitive member 1 by moving the primary transfer roller 32 toward the photosensitive member 1.

<Configuration of Process Cartridge>

Next, the process cartridge 7 attached to the image forming apparatus 100 according to the present embodiment will be described further below. FIG. 2 is a schematic cross-sectional view illustrating the process cartridge 7 as viewed in a rotational axis direction of the photosensitive member 1.

The process cartridge 7 is attachable to and detachable from the body 110 of the image forming apparatus 100 via an attachment unit, such as an attachment guide and a positioning member, disposed to the image forming apparatus 100. According to the present embodiment, the body 110 of the image forming apparatus 100 refers to the image forming apparatus 100 excluding the process cartridge 7. According to the present embodiment, the process cartridges 7 for the different colors all have the same shape, and yellow (Y), magenta (M), cyan (C), and black (K) toners t are stored in the different process cartridges 7. According to the present embodiment, configurations and operations of the process cartridges 7 for the different colors are substantially the same, except for the types (colors) of the toners t stored in the process cartridges 7. Each process cartridge 7 includes the development device (development unit) 4 and a photosensitive unit 8.

The development device (development unit) 4 includes a development container (development frame member) 45. The development container 45 is divided into a development chamber 45*a* and a toner storage chamber (developer storage portion) 45*b*.

The toner storage chamber 45*b* stores the toner t. The toner t is a non-magnetic one-component developer. In the toner storage chamber 45*b*, a toner conveyance member (developer conveyance member) 44 is disposed. The toner conveyance member 44 is driven to rotate in an arrow R5 direction (clockwise direction) in FIG. 2 by a driving force transmitted from the driver 80 (FIG. 3) serving as the drive unit and conveys the toner t to the development chamber 45*a*.

In the development chamber 45*a*, the development roller 41 serving as a development member (developer bearing member) is disposed. During image forming (during development), the development roller 41 is brought into contact with the photosensitive member 1 and driven to rotate in an arrow R3 direction (anti-clockwise direction) in FIG. 2 by a driving force transmitted from the driver 80 serving as the drive unit. According to the present embodiment, the development roller 41 and the photosensitive member 1 each rotate so that a surface of the development roller 41 and the surface of the photosensitive member 1 move in a forward direction at the development portion P3 where the development roller 41 and the photosensitive member 1 face (are in contact) with each other. According to the present embodiment, the development roller 41 includes a conductive core metal and a conductive rubber layer (elastic layer) disposed around the core metal. The rotation direction of the development roller 41 is not limited to the rotation direction according to the present embodiment, and the development roller 41 may rotate in a direction so that the surface of the development roller 41 and the surface of the photosensitive member 1 move in a reverse direction at the development portion P3.

In the development chamber 45*a*, a supply roller 42 serving as a supply member configured to supply the toner t conveyed from the toner storage chamber 45*b* to the development roller 41 is disposed. The supply roller 42 is disposed in contact with the development roller 41. During image forming (during development), the supply roller 42 is driven to rotate in an arrow R4 direction (anti-clockwise direction) in FIG. 2 by a driving force transmitted from the driver 80 serving as the drive unit. According to the present embodiment, the supply roller 42 and the development roller 41 each rotate so that a surface of the supply roller 42 and the surface of the development roller 41 move in a reverse direction at a contact portion between the supply roller 42 and the development roller 41. The rotation direction of the supply roller 42 is not limited to the rotation direction according to the present embodiment, and the supply roller 42 may rotate in a direction so that the surface of the supply roller 42 and the surface of the development roller 41 move in a forward direction at the contact portion between the supply roller 42 and the development roller 41.

In the development chamber 45*a*, a development blade 43 serving as a regulation member is disposed. The development blade 43 regulates a coating amount of the toner t on the development roller 41 that is supplied by the supply roller 42, and applies a charge to the toner t.

Independent voltages are applied to the development roller 41, the supply roller 42, and the development blade 43 from high-voltage power supplies. The toner t supplied to the development roller 41 by the supply roller 42 is frictionally charged by friction between the development roller 41 and the development blade 43, and a charge is applied to the toner t while a layer thickness of the toner t is regulated. As the development roller 41 rotates, the toner t with the regulated layer thickness on the development roller 41 is conveyed to the development portion P3, which is a facing portion (contact portion) between the development roller 41 and the photosensitive member 1, adheres to an image portion of an electrostatic latent image on the photosensitive member 1, and forms a toner image on the photosensitive member 1.

During image forming (during development), the predetermined development voltage (development bias) Vdc is applied to the development roller 41 by the development power supply (high-voltage power supply) 72 (FIG. 3) serving as a development voltage applicator. The predetermined development voltage (development bias) Vdc is the DC voltage with the predetermined polarity (negative polarity according to the present embodiment). According to the present embodiment, the development voltage Vdc is −300 V. Thus, at the development portion P3, a development contrast Vcont (=Vl−Vdc), which is the potential difference between the light-area potential Vl on the photosensitive member 1 and the development bias (potential on the development roller 41), becomes +200 V. During image forming (during development), a predetermined supply voltage (supply bias) Vrs is applied to the supply roller 42 by a supply power supply (high-voltage power supply) 75 (FIG. 3) serving as a supply voltage applicator. The predetermined supply voltage Vrs is a DC voltage of a predetermined polarity (negative polarity according to the present embodiment). According to the present embodiment, the supply voltage Vrs is −350 V. By adjusting a potential difference (ΔVr) between the supply roller 42 and the development roller 41, a supply amount of the toner t to the development roller 41 is adjusted. According to the present embodiment, ΔVr (=Vdc−Vrs) is +50 V. This is a potential setting that facilitates the movement of the negatively charged toner t from the supply roller 42 to the development roller 41. During image forming (during development), a predetermined regulation voltage (regulation bias) is applied to the development blade 43 by a regulation power supply (high-voltage power supply) 76 (FIG. 3) serving as a regulation voltage applicator. The predetermined regulation voltage is a DC voltage of a predetermined polarity (negative polarity according to the present embodiment). According to the present embodiment, the regulation voltage is −350 V, which is the same as the supply voltage. The foregoing settings such as the development bias Vdc are default settings for the body 110 of the image forming apparatus 100 and the process cartridge 7 in new condition.

As described above, unless otherwise specified, magnitudes (levels) of voltages or potentials are based on the absolute values of the voltages or potentials. Specifically, a potential or an applied voltage with a larger absolute value on the negative polarity side (e.g., −1000 V with respect to −500 V) is referred to as a high potential, whereas a potential or an applied voltage with a smaller absolute value on the negative polarity side (e.g., −300 V with respect to −500 V) is referred to as a low potential. This is because, according to the present embodiment, the negatively charged toner t is used as a reference.

A voltage is expressed as a potential difference from a ground potential (0 V). Thus, a development voltage of −300 V indicates having a potential difference of −300 V with respect to the ground potential due to the development voltage applied to the core metal of the development roller 41. The same applies to other voltages such as the charging voltage.

The photosensitive unit 8 includes a photosensitive unit container (photosensitive unit frame member) 53. The photosensitive member 1 is attached to the photosensitive unit container 53 with a bearing positioned in between, so that the photosensitive member 1 can rotate. The photosensitive member 1 is driven to rotate in the arrow R1 direction (clockwise direction) in FIG. 2 by receiving a driving force transmitted from the drive unit 80 (FIG. 3) serving as the drive unit. The photosensitive unit 8 is disposed with the charging roller 2 and the cleaning blade 51 disposed in contact with the surface (outer peripheral surface) of the photosensitive member 1. The cleaning blade 51 is a plate-shaped elastic member. The charging roller 2 is attached to the photosensitive unit container 53 with a bearing in between so that the charging roller 2 can rotate. One end portion (fixed end portion) of the cleaning blade 51 is fixed to a plate-shaped metal plate attached to the photosensitive unit container 53, and another end portion (free end portion) of the cleaning blade 51 is in contact with the photosensitive member 1 and forms a cleaning nip. The cleaning nip is a contact portion between the cleaning blade 51 and the photosensitive member 1. The cleaning blade 51 rubs against the surface of the photosensitive member 1, scrapes off the residual toner t and particles that remain on the photosensitive member 1 after the primary transfer process, and stores the scraped toner t and particles in the waste toner storage chamber 52 formed in the photosensitive unit container 53. This configuration prevents the toner t from adhering to the charging roller 2 and being carried around by the photosensitive member 1, which would hinder appropriate image formation. The cleaning device 5 includes the cleaning blade 51 and the waste toner storage chamber 52 (the photosensitive unit container 53).

The image forming apparatus 100 includes a contact and separation mechanism 60 for bringing each development roller 41 into contact with the corresponding photosensitive member 1 and separating each development roller 41 from the corresponding photosensitive member 1. According to the present embodiment, the development container 45 is attached to the photosensitive unit container 53 so that the development container 45 can swing, and the development container 45 is biased by a compression spring in a direction in which the development roller 41 is brought into contact with the photosensitive member 1. The compression spring is a biasing member serving as a biasing unit. The contact and separation mechanism 60 is configured to separate the development roller 41 from the photosensitive member 1 by moving (pivoting) the development container 45 against a biasing force of the compression spring. The contact and separation mechanism 60 is configured to bring the development roller 41 into contact with the photosensitive member 1 by allowing the development container 45 to be moved (pivoted) by the biasing force of the compression spring. According to the present embodiment, when the image forming apparatus 100 is stopped, the development roller 41 is separated from the photosensitive member 1 by the contact and separation mechanism 60. Then, during image forming (during development), the development roller 41 is brought into contact with the photosensitive member 1 by the contact and separation mechanism 60. The contact and separation mechanism 60 is driven by a driving force transmitted from the driver 80 serving as a drive unit (FIG. 3).

<Control Configuration of Image Forming Apparatus>

Next, a control configuration of the image forming apparatus 100 according to the present embodiment will be described below. FIG. 3 is a block diagram illustrating a control configuration of main components of the image forming apparatus 100 according to the present embodiment.

The image forming apparatus 100 includes a controller 202. The controller 202 controls operation of the image forming apparatus 100. Signals indicating various types of information are input to the controller 202 and output from the controller 202 via an electric connection. The controller 202 processes signals input from various processing devices and sensors and processes signals to be output to issue operation commands to various processing devices. A controller 200 disposed in the image forming apparatus 100 inputs and outputs various signals in communication with external apparatuses (host apparatus) and inputs and outputs various signals with the controller 202 via an interface 201 included in the image forming apparatus 100. The controller 202 comprehensively controls the operation of the image forming apparatus 100 based on predetermined control programs and reference tables as instructed by the controller 200.

The controller 202 includes a central processing unit (CPU) 221 and a memory 222, such as a random access memory (RAM), a read-only memory (ROM), and a non-volatile memory. The CPU 221 serves as a calculation processor that is a central element for performing various calculations, and the memory 222 is a storage element serving as a storage unit that stores information. The RAM temporarily stores detection results of the sensors, count results of a counter, and calculation results. The ROM stores control programs and data tables acquired in advance by experiment. The non-volatile memory stores the count results of the counter, various types of setting information, and the results of the sensors. Control targets, the sensors, and the counter of the image forming apparatus 100 are connected to the controller 202. The controller 202 controls predetermined image forming sequences by controlling the input and output of various signals and timings to drive the components.

The controller 202 controls, for example, the charging power supply 71, the development power supply 72, the supply power supply 75, the regulation power supply 76, the exposer 3, the primary transfer power supply 73, the secondary transfer power supply 74, and the driver 80. The controller 202 also controls the contact and separation mechanism 60, a charging current detector (charging current detection circuit) 61 configured to detect a charging current flowing through the charging portion P1 (the charging roller 2, the charging power supply 71), and the belt contact and separation mechanism 90.

According to the present embodiment, the charging power supply 71, the development power supply 72, the supply power supply 75, the regulation power supply 76, the primary transfer power supply 73, the contact and separation mechanism 60, and the charging current detector 61 are disposed independently of each image forming unit S. The driver 80 includes a drive motor serving as a drive source and a drive transmission member. The drive sources for driving the photosensitive member 1, the intermediate transfer belt 31, a rotation member of the development device 4, the contact and separation mechanism 60, and the belt contact and separation mechanism 90 may be disposed independently of each other, or at least part of the drive sources may be standardized. Drive sources for driving elements for different colors may be disposed independently of each other, or at least part of the drive sources may be used in common.

The image forming apparatus 100 performs a sequence of image forming operations (print job) that is started based on a single start instruction to form an image on one or more recording materials P and outputting the resulting recording materials P. The image forming operations generally include an image forming process, a pre-process (pre-rotation process, pre-printing operation), a sheet interval process in forming an image on a plurality of recording materials P, and a post-process (post-rotation process, post-printing operation). The image forming process is a period during which operations of forming an electrostatic latent image of an image to be formed on a recording material P and output, forming a toner image, performing primary transfer of the toner image, performing secondary transfer of the toner image, and fixing the toner image, and the term "during image forming" refers to this period. More specifically, timings during image forming differ at different positions where the charging, exposure, development, primary transfer, secondary transfer, and fixing processes are performed. The pre-process is a period during which preparation operations prior to the image forming process are performed after the start instruction is input and before the image forming actually starts.

The sheet interval process is a period between recording materials P in forming an image on a plurality of recording materials P continuously (continuous image forming). The post-rotation process is a period during which cleaning-up operations (preparation operations) are performed after the image forming process. The discussion of during non-image forming refers to a period other than the period during image forming and includes the pre-process, the sheet interval process, the post-process. A pre-multiple-rotation process may be a preparation operation at the time of supplying power to the image forming apparatus 100 or recovering from a sleep state.

<Configuration of Photosensitive Member>

Next, the photosensitive member 1 according to the present embodiment will be described further.

As the photosensitive member 1, a member formed by providing a photosensitive material, such as an organic photoconductive (OPC) semiconductor, amorphous selenium, or amorphous silicon, on a cylindrical drum base formed of aluminum or nickel and serving as a support member may be used. The photosensitive member 1 may include a wear-resistant protective layer on its outermost layer to improve wear-resistance. With the protective layer, the photosensitive member 1 becomes more durable. According to the present embodiment, the photosensitive member 1 is an OPC photosensitive member with a photosensitive layer including an organic photoconductive semiconductor. According to the present embodiment, the photosensitive member 1 includes a cylindrical, conductive, metal support member having an outer diameter of 24 mm, a conductive layer serving as an undercoating layer of the support member, the photosensitive layer (charge generation layer, charge transport layer) formed on the undercoating layer, and the protective layer formed on the photosensitive layer.

The protective layer desirably contains conductive particles and/or charge transport material and resin. Examples of conductive particles include particles of metal oxides, such as titanium oxide, zinc oxide, tin oxide, and indium oxide. Examples of charge transport materials include polycyclic aromatic compounds, heterocyclic compounds, hydrazone compounds, styryl compounds, enamine compounds, benzidine compounds, triarylamine compounds, and resins having a moiety derived from these substances. Among those described above, triarylamine compounds and benzidine compounds are desirable. Examples of resins include polyester resins, acryl resins, phenoxy resins, polycarbonate resins, polystyrene resins, phenol resins, melamine resins, and epoxy resins. Among those described above, polycarbonate resins, polyester resins, and acryl resins are desirable.

The protective layer may be formed as a cured film by polymerizing a composition containing monomers with polymerizable functional groups. Examples of reactions in this case include thermal polymerization reactions, photopolymerization reactions, and radiation polymerization reactions. Examples of polymerizable functional groups of monomers with polymerizable functional groups include acryl groups and methacryl groups. Materials with charge transport capability may be used as the monomers with polymerizable functional groups.

The protective layer may contain additives such as an antioxidant, an ultraviolet absorbing agent, a plasticizing agent, a leveling agent, a slip agent, and/or a wear-resistance enhancer. Specific examples include hindered phenol compounds, hindered amine compounds, sulfur compounds, phosphorus compounds, benzophenone compounds, siloxane-modified resins, silicone oil, fluororesin particles, polystyrene resin particles, polyethylene resin particles, silica particles, alumina particles, and boron nitride particles.

The protective layer desirably has an average film thickness of 0.5 μm or more and less than or equal to 10 μm, more desirably 1 μm or more and less than or equal to 7 μm. According to the present embodiment, the average film thickness of the protective layer is 3 μm.

The protective layer is formed by preparing a protective layer coating solution containing materials described above and solvents, forming a coating film using the coating solution, and drying and/or curing the coating film. Examples of solvents for use in the coating solution include alcohol-based solvents, ketone-based solvents, ether-based solvents, sulfoxide-based solvents, ester-based solvents, and aromatic hydrocarbon-based solvents.

<Composition of Toner>

Next, the composition of the toner t will be described further.

According to the present embodiment, a toner with inorganic particles surface-treated by modifying host particles (toner particles) with inorganic silicon to ensure flowability and enhance charging characteristics is used as the toner t. The toner t that is used according to the present embodiment is a non-magnetic, one-component particle polymerization toner with a negative charging polarity and an average particle size of 7 μm.

According to the present embodiment, an external additive composed of fatty acids and metal salts is added to the surface of the toner t in addition to inorganic silicon in order to control the flowability and charging characteristics of the toner t. Specific examples include fatty acids, such as stearic acid, myristic acid, lauric acid, ricinoleic acid, and octylic acid and metal salts with metals, such as lithium, magnesium, calcium, barium, and zinc. According to the present embodiment, zinc stearate is added as an external additive to the surface of the toner t. Types of external additives are not limited to those described above, and lead stearate, cadmium stearate, barium stearate, calcium stearate, aluminum stearate, zinc stearate, magnesium stearate, zinc laurate, and zinc myristate may also be used as needed. At least one type of an external additive may be selected from those described above and used. According to the present embodiment, zinc stearate with an average particle size of 0.60 μm is used.

Next, a method for manufacturing toner particles will be described below.

A publicly known method for manufacturing toner particles may be used, such as a mixing and grinding method or a wet manufacturing method. From the point of view of particle size equalization and shape controllability, a wet manufacturing method is desirable. Examples of wet manufacturing methods that can be used include a suspension polymerization method, a solution suspension method, an emulsion polymerization aggregation method, and an emulsion aggregation method.

According to the present embodiment, a suspension polymerization method is employed. In the suspension polymerization method, first, polymerizable monomers for forming a binder resin and other additives, as needed, such as colorants, are dissolved or dispersed uniformly with a disperser, such as a ball mill or an ultrasonic disperser, and a polymerizable monomer composition is prepared. This process is referred to as a polymerizable monomer composition preparation process. In this process, multifunctional monomers, chain transfer agents, waxes as release agents, charge control agents, and/or plasticizing agents may be added as needed. Examples of polymerizable monomers suitable for use in the suspension polymerization method include vinyl-based polymerizable monomers, such as styrene, styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene, acryl-based polymerizable monomers such as methyl acrylate, ethyl acrylate, n-propyl acrylate, iso-propyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate, methacryl-based polymerizable monomers such as methyl methacrylate, ethyl methacrylate, n-propyl methacrylate, iso-propyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate, methylene aliphatic monocarboxylic acid esters, vinyl esters such as vinyl acetate, vinyl propionate, vinyl butyrate, vinyl benzoate, and vinyl formate, vinyl ethers such as vinylmethyl ether, vinylethyl ether, and vinylisobutyl ether, vinylmethyl ketone, vinylhexyl ketone, and vinylisopropyl ketone.

Next, the polymerizable monomer composition is introduced into an aqueous medium prepared in advance, and droplets of the polymerizable monomer composition are formed into a desired toner particle size using a mixer or disperser with high shear force. This process is referred to as a granulation process. The aqueous medium in the granulation process desirably contains a dispersion stabilizer in order to control the toner particle size, sharpen the particle size distribution, and prevent toner particles from agglomerating during the manufacturing process. In general, dispersion stabilizers are divided roughly into polymers that exhibit repulsive force due to steric hindrance and sparingly water-soluble inorganic compounds that achieve dispersion stabilization through electrostatic repulsion. Sparingly water-soluble inorganic compound particles are desirably used because they dissolve in acid or alkali and therefore can be removed easily by washing with acid or alkali to dissolve them in the acid or alkali after polymerization.

Dispersion stabilizers of sparingly water-soluble inorganic compounds that contain one of magnesium, calcium, barium, zinc, aluminum, and phosphorus are desirably used. More desirably, one of magnesium, calcium, aluminum, and phosphorus is contained.

Specific examples include magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite.

The dispersion stabilizers may be used in combination with organic compounds, such as polyvinyl alcohol, gelatin, methylcellulose, methylhydroxypropylcellulose, sodium salts of carboxymethylcellulose, or starch. Desirably, the dispersion stabilizers are used at 0.01 parts by mass or more and less than or equal to 2.00 parts by mass per 100 parts by mass of polymerizable monomers.

For the fine dispersion of the dispersion stabilizers, surfactants may be used at 0.001 parts by mass or more and less than or equal to 0.1 parts by mass per 100 parts by mass of polymerizable monomers. Specifically, commercially available nonionic surfactants, anionic surfactants, and cationic surfactants can be used. For example, dodecyl sodium sulfate, tetradecyl sodium sulfate, pentadecyl sodium sulfate, octyl sodium sulfate, sodium oleate, sodium laurate, potassium stearate, and calcium oleate are desirably used.

After the granulation process, or while the granulation process is performed, the temperature is desirably set to 50° C. or higher and lower than or equal to 90° C., and the polymerizable monomers contained in the polymerizable monomer composition are polymerized to obtain a toner-particle dispersion liquid. This process is referred to as a polymerization process. In the polymerization process, a stirring operation is desirably performed to achieve a uniform temperature distribution in the container. Adding a polymerization initiator allows for the initiation of a polymerization reaction at a specific time and allows the polymerization reaction to proceed for a desired period. In order to achieve a desired molecular weight distribution, the temperature may be increased in the latter half of the polymerization reaction. In order to remove unreacted polymerizable monomers and byproducts from the system, a portion of the aqueous medium may be removed by a distillation operation in the latter half of the reaction or after the reaction ends. The distillation operation may be performed under normal pressure or decreased pressure.

In general, an oil-soluble initiator is used as a polymerization initiator in the suspension polymerization method. Examples include azo compounds such as 2,2'-azobisisobutyronitrile, 2,2'-azobis-2,4-dimethylvaleronitrile, 1,1'-azobis (cyclohexane-1-carbonitrile), and 2,2'-azobis-4-methoxy-2, 4-dimethylvaleronitrile and peroxide-based initiators such as acetylcyclohexysulfonyl peroxide, diisopropylperoxy carbonate, decanoyl peroxide, lauroyl peroxide, stearoyl peroxide, propionyl peroxide, acetyl peroxide, tert-butylperoxy-2-ethylhexanoate, benzoyl peroxide, tert-butylperoxyisobutyrate, cyclohexanone peroxide, methyl ethyl ketone peroxide, dicumyl peroxide, tert-butyl hydroperoxide, di-tert-butyl peroxide, tert-butylperoxypivalate, and cumene hydroperoxide.

The polymerization initiator may be used in combination with a water-soluble initiator as needed. Examples include ammonium persulfate, potassium persulfate, 2,2'-azobis (N,N'-dimethyleneisobutyroamidine) hydrochloride, 2,2'-azobis (2-aminodinopropane) hydrochloride, azobis (isobutylamidine) hydrochloride, 2,2'-azobisisobutyronitrile sodium sulfonate, ferrous sulfate, or hydrogen peroxide.

The polymerization initiators may be used alone or in combination, and in order to control the degree of polymerization of polymerizable monomers, chain transfer agents and/or polymerization inhibitors may also be added and used.

The toner t may contain organic silicon polymers with one or more and less than or equal to three carbon atoms directly bonded to a silicon atom. The organic silicon polymers may have a substructure expressed as $R—SiO_{3/2}$, where R is a hydrocarbon group with a carbon number ranging from 1 to 6, or R may be a hydrocarbon group with a carbon number ranging from 1 to 3.

An amount of inorganic silica transferred during washing was controlled by changing an amount of external addition, a rotation speed (circumferential speed) of a tip of a blade, and a rotation time (time) of the blade, which are addition conditions, using a Henschel mixer (manufactured by Japan Coke Industry Co., Ltd.) as a surface modification apparatus. Table 1 below presents addition conditions of the toner t according to the present embodiment. Details of the surface modification apparatus, the circumferential speed of the surface modification apparatus, and the time, which are addition conditions, are as discussed in Japanese Patent Application Laid-Open No. 2016-38591. According to the present embodiment, the toner t with 0.20 wt % of zinc stearate added externally was used.

the present embodiment. The charging current measurement was conducted during a pre-process of a printing operation. It can be seen that a charging current value $I_B$ after new toner replenishment has increased compared to a charging current value $I_A$ (dashed line) before new toner replenishment.

Figure 5:
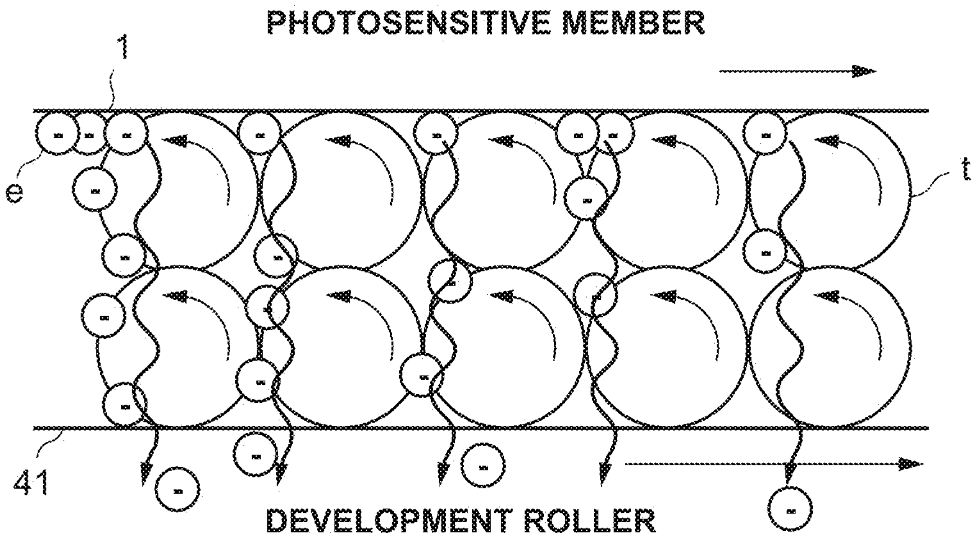
FIG. 5 is a schematic diagram illustrating a mechanism of changes in charging current values before and after toner replenishment.

A mechanism by which the charging current value increases as described above will be described below with reference to FIG. 5. FIG. 5 is a schematic diagram illustrating the development portion P3 where the photosensitive member 1 and the development roller 41 are in contact with each other. At the development portion P3, the photosensitive member 1 and the development roller 41 are in contact with each other via particles of the toner t. As illustrated in FIG. 5, normally, negative charges e on the photosensitive member 1 move to the development roller 41 through the particles of the toner t, and in a case where there is an abundant amount of external additive with high charging characteristics on the surface, as is the case with new toner, the movement amount of the negative charges e increases, and the negative charges e on the photosensitive member 1 decrease. Consequently, the surface potential of the photosensitive member 1 in a position downstream of the development portion P3 in the rotation direction of the photosensitive member 1 becomes lower than −500 V, which is the surface potential at the time of arriving at the development portion P3. This increases an amount necessary to be recharged when the surface of the photosensitive member 1 passes through the charging portion P1 next time, which increases the charging current. By detecting a change in the charging current, whether there is a change in charging characteristics (amount of charge) of the toner can be detected.

<Image Forming Condition Control Process Based on Charging Current Detection>

Figure 6:
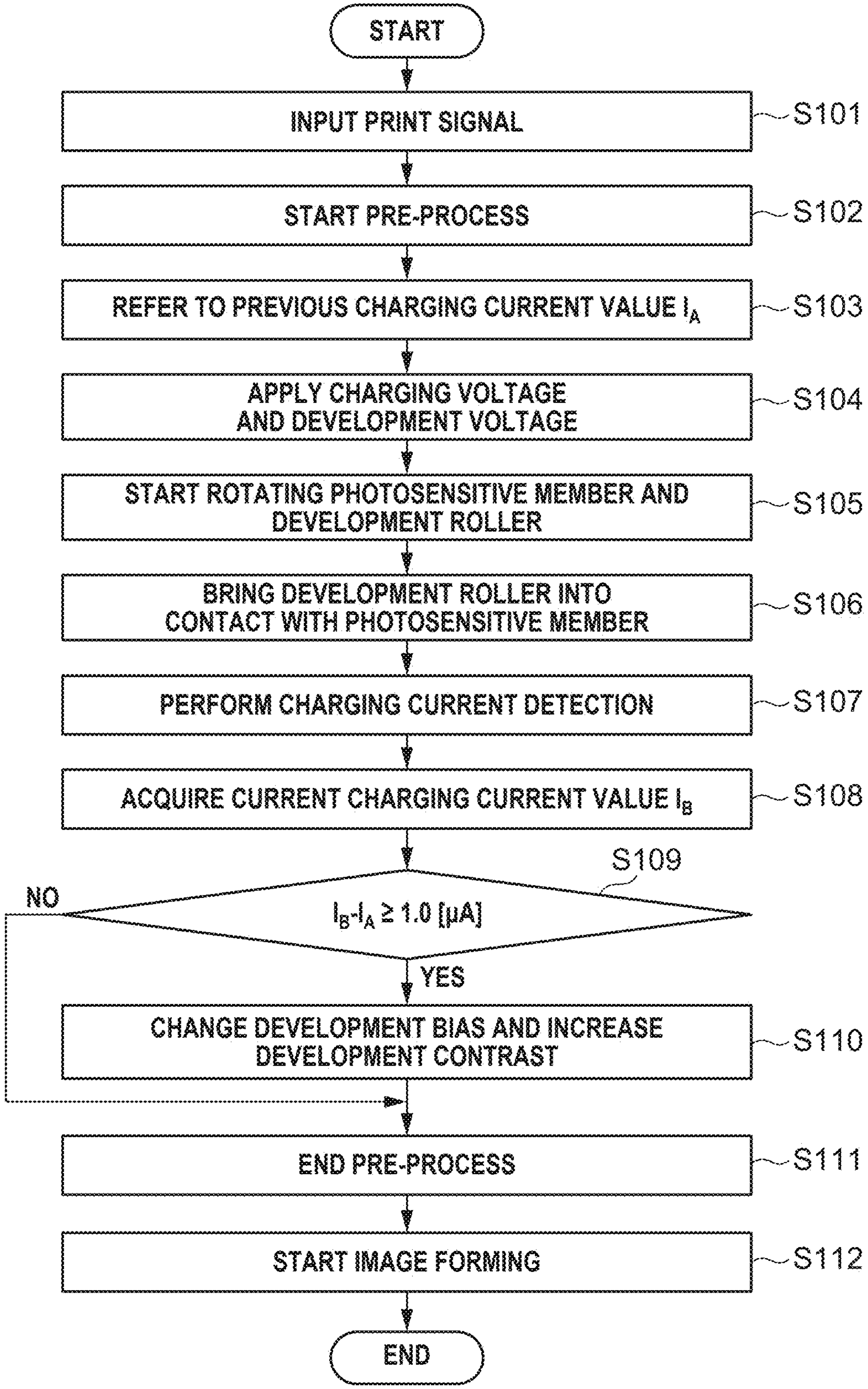
FIG. 6 is a flowchart illustrating a control according to the first embodiment.

Next, control of image forming conditions based on charging current detection according to the present embodiment will be described below. FIG. 6 is a flowchart illustrating an outline of a process of controlling the image forming conditions based on charging current detection according to the present embodiment. While the control of the image forming conditions based on charging current detection according to the present embodiment described below with reference to FIG. 6 is performed for each image forming unit S, the following description will focus only on one image forming unit S.

TABLE 1

| | Inorganic Silicon External Additive | | | | | | | | Metal External Additive | |
|---|---|---|---|---|---|---|---|---|---|---|
| | First-stage Addition Conditions | | | | Second-stage Addition Conditions | | | | | Amount |
| | Amount of Silica [wt %] | Apparatus | Circumferential Speed [m/s] | Time [sec] | Amount of Silica [wt %] | Apparatus | Circumferential Speed [m/s] | Time [sec] | Type | of Addition [wt %] |
| Toner | 0.8 | Surface Modification Apparatus | 40 | 300 | 0.8 | Surface Modification Apparatus | 40 | 60 | Zinc Stearate | 0.2 |

<Method for Determining Charging Characteristics of Toner Based on Charging Current Detection>

Next, a method for determining charging characteristics of toner based on charging current detection according to the present embodiment will be described below.

Figure 4:
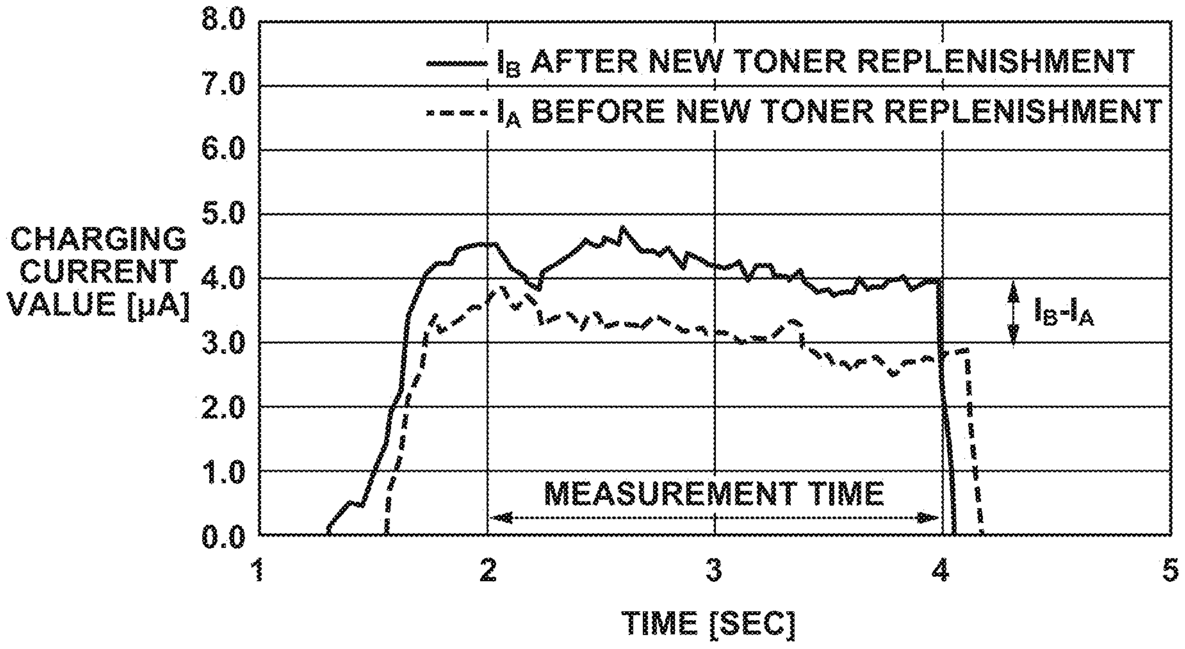
FIG. 4 is a graph illustrating changes in charging current values before and after toner replenishment.

FIG. 4 is a graph illustrating an example of results of charging current measurement before and after replenishment of the development device 4 of the process cartridge 7 with new toner (before new toner replenishment, after new toner replenishment) outside the body 110 of the image forming apparatus 100 having the configuration according to As described above, for example, in a case where the development device 4 is replenished with new toner and there is an increase in charging characteristics of the toner in the development device 4, the amount of charge per toner increases, so that the number of toner particles to be used to fill the latent image electric potential decreases. This may be visualized as dilution.

Thus, according to the present embodiment, in a case where the controller 202 determines that there is an increase in charging characteristics of the toner in the development device 4 based on a result of the charging current detection, the controller 202 performs control to increase the development contrast. Especially, according to the present embodiment, the controller 202 performs control to increase the development contrast by changing the development bias Vdc. According to the present embodiment, a charging current detection operation is performed during the pre-process of the printing operation. According to the present embodiment, the charging current detection operation is performed before the printing operation using the charging current detector 61 each time the printing operation is performed, and a charging current value detection result is stored in the storage unit (or the memory 222) in the charging current detector 61.

First, in step S101, a print signal is input from an external apparatus to the controller 202 via the controller 200 and the interface 201. In step S102, the controller 202 starts the pre-process. In step S103, the controller 202 reads a detection result of the previous charging current value $I_A$ from the storage unit (or the memory 222) in the charging current detector 61. In step S104, the controller 202 causes the charging power supply 71 to apply the charging voltage to the charging roller 2 and charge the surface of the photosensitive member 1 to −500 V and causes the development power supply 72 to apply a development bias of −300 V to the development roller 41. In step S105, the controller 202 starts driving and rotating the photosensitive member 1 and the development roller 41. In step S106, the controller 202 brings the development roller 41 into contact with the photosensitive member 1. In step S107, the controller 202 causes the charging current detector 61 to detect the charging current over a predetermined time (two seconds according to the present embodiment). In step S108, the controller 202 acquires a result of the detection of the charging current value $I_B$ in the current operation. The controller 202 causes the charging current detector 61 to detect the charging current over the predetermined time starting from the moment when the surface of the photosensitive member 1 located at the development portion P3 at the time of bringing the development roller 41 into contact with the charged surface of the photosensitive member 1 first arrives at the charging portion P1. Then, the controller 202 stores, in the storage unit (or the memory 222) in the charging current detector 61, the mean value of the charging currents detected at predetermined sampling intervals within the predetermined time as the detection result of the charging current value in the current operation.

The predetermined time of the charging current detection is set so that the charging current detection is performed with desired accuracy. The predetermined time of the charging current detection is desirably, for example, one second or more and less than or equal to five seconds. During the charging current detection (while the surface of the photosensitive member 1 that is to pass through the charging portion P1 during the charging current detection is passing through the primary transfer position P4), the photosensitive member 1 and the intermediate transfer belt 31 are being separated. During the charging current detection (while the surface of the photosensitive member 1 that is to pass through the charging portion P1 during the charging current detection is passing through the pre-exposure portion P5), the pre-exposure by the pre-exposure device 6 is being turned off.

Then, in step S109, the controller 202 determines whether the difference ($=I_B-I_A$) between the detection result of the charging current value $I_B$ in the current operation and the detection result of the charging current value $I_A$ in the previous operation is greater than or equal to a predetermined threshold. In a case where the difference ($=I_B-I_A$) between the charging current values is greater than or equal to the predetermined threshold (in a case where $I_B$ is greater by a predetermined amount or more than $I_A$), it can be determined that the charging characteristics of the toner t has increased. According to the present embodiment, the predetermined threshold is 1.0 μA. The threshold for the charging current value difference is not limited to the value according to the present embodiment, and any appropriate threshold may be set based on an apparatus configuration or an intended accuracy.

In step S109, in a case where the controller 202 determines that the difference ($=I_B-I_A$) between the charging current values is greater than or equal to the predetermined threshold (YES in step S109), the processing proceeds to step S110. In step S110, the controller 202 changes the development bias that the development power supply 72 applies to the development roller 41 from −300 V to −350 V to increase the development contrast in order to prevent a dilution that is caused by new toner. In step S111, the controller 202 ends the pre-process, and in step S112, the controller 202 starts image forming. In step S109, in a case where the controller 202 determines that the difference ($=I_B-I_A$) between the charging current values is not greater than or equal to the predetermined threshold (the difference is less than the predetermined threshold) (NO in step S109), the processing proceeds to step S111. In step S111, the controller 202 ends the pre-process without changing the development contrast, and in step S112, the controller 202 starts image forming.

Modified Examples

Changing the development bias is not the only method for changing the development contrast to prevent a dilution. The development contrast can be increased also by increasing an amount of laser light of the exposer 3 (exposure intensity: $\mu J/cm^2$) and lowering the light-area potential Vl. The development contrast can be increased also by decreasing the charging bias and lowering the after-exposure light-area potential Vl. The development bias, the amount of laser light of the exposer 3, and the charging bias may be controlled in any combination.

According to the present embodiment, the image forming condition (development contrast) is changed based on the difference between $I_A$ and $I_B$ ($=I_B-I_A$). Specifically, according to the present embodiment, in a case where the difference between $I_A$ and $I_B$ ($=I_B-I_A$) is greater than or equal to the predetermined threshold (in a case where $I_B$ is greater by the predetermined value or more than $I_A$), it is determined that there is an increase in charging characteristics of the toner. However, the present disclosure is not limited to this form as long as a magnitude relationship between $I_A$ and $I_B$ is determined based on a comparison between $I_A$ and $I_B$. For example, in a case where the ratio of $I_B$ to $I_A$ (such as $I_B/I_A$) is greater than or equal to a predetermined value, it is determined that there is an increase in charging characteristics of the toner. For example, $I_A$ and $I_B$ are compared to obtain the magnitude relationship between $I_A$ and $I_B$, and in a case where $I_B$ is greater than $I_A$, it is determined that there is an increase in charging characteristics of the toner.

While the case where the development device 4 is replenished with new toner according to the present embodiment is described above as an example, control similar to the control according to the present embodiment may be applied in a case where the development device 4 is replenished with toner regardless of whether the toner is new toner, whereby effects similar to those of the present embodiment are produced.

While, in the present embodiment, the case in which replenishing the development device 4 with toner causes an increase in charging characteristics of the toner in the development device 4 is described above as a typical example, the present disclosure is not limited to this form. There may be a case in which replenishing the development device 4 with toner causes a decrease in charging characteristics of the toner in the development device 4. Depending on characteristics (composition of toner particles and formulation of external additive) or state of toner with which the development device 4 is replenished, there may be a decrease in charging characteristics of the toner in the development device 4 after the toner replenishment. In a case where there is a decrease in charging characteristics of the toner in the development device 4, for example, a phenomenon where the image density becomes too high may be observed. Thus, the controller 202 may change the image forming condition (development contrast) in a case where it is determined that there is a decrease in charging characteristics of the toner in the development device 4 based on a result of the charging current detection, in addition to or in place of a case where it is determined that there is an increase in charging characteristics of the toner in the development device 4 based on a result of the charging current detection. The development contrast may be decreased in a case where, for example, the difference between $I_A$ and $I_B$ ($=I_B-I_A$) is less than or equal to a predetermined threshold that is a negative value (in a case where $I_A$ is greater by a predetermined value or more than $I_B$). The development contrast can be decreased by reducing the development bias, by reducing the amount of laser light of the exposer 3 to increase the light-area potential Vl, or by increasing the charging bias to increase the after-exposure light-area potential Vl. The development bias, the amount of laser light of the exposer 3, and the charging bias may be controlled in any combination. In this case, as in the cases described above, the magnitude relationship between $I_A$ and $I_B$ is to be determined by comparing $I_A$ and $I_B$, and the control based on the difference between $I_A$ and $I_B$ is not the only form of control.

While the image forming condition (development contrast) is switched between two levels based on a result of the charging current detection according to the present embodiment, the present disclosure is not limited to this form. The image forming conditions (development contrast) may be changed between three or more levels based on a result of the comparison between $I_A$ and $I_B$. For example, the development contrast may be controlled so that the greater the difference between $I_A$ and $I_B$ ($=I_B-I_A$), the higher the development contrast. In this case, for example, information indicating a relationship between the difference between $I_A$ and $I_B$ ($=I_B-I_A$) and the development contrast may be preset as table data, or a plurality of thresholds may be set, to allow the development contrast to be changed across three or more levels.

As for the charging current value, the configuration is not limited to those based on a comparison between a detection result in the current operation and a detection result in the previous operation. A charging current value detection result in the current operation may be compared with a charging current value detection result in the past operation (such as a detection result from several instances ago, a plurality of previous detection results, a mean value of a plurality of previous detection results) in a case in which detection of toner replenishment is performed with desired accuracy.

<Effects>

According to the present embodiment, the image forming apparatus 100 includes the photosensitive member 1 configured to rotate, the charger (charging roller) 2 configured to contact the photosensitive member 1 to form the charging portion P1 and charge the surface of the photosensitive member 1, as the surface is being rotated, the charging voltage applicator (charging power supply) 71 configured to apply the charging voltage to the charger 2, the exposer 3 configured to expose the surface of the photosensitive member 1 charged by the charger 2 and form an electrostatic latent image on the surface of the photosensitive member 1, the development device 4 including the rotary development member (development roller) 41 configured to form the development portion P3 where the developer is supplied to the surface of the photosensitive member 1 and form a developer image on the surface of the photosensitive member 1 by supplying the developer charged to the predetermined polarity to the electrostatic latent image on the surface of the photosensitive member 1 at the development portion P3, the development device 4 further including the developer storage portion (toner storage chamber) 45*b* for storing the developer to be supplied to the development member 41, the development voltage applicator (development power supply) 72 configured to apply, to the development member 41, the development voltage on the predetermined polarity side with respect to the potential of the electrostatic latent image at the development portion P3, the charging current detector 61 configured to detect the charging current flowing through the charging portion P1 during the charging of the surface of the photosensitive member 1 by the charger 2, and the controller 202 configured to control the charging voltage applicator 71, the exposer 3, and the development voltage applicator 72, wherein the image forming apparatus 100 performs an image forming operation of forming the developer image on the surface of the photosensitive member 1 and a non-image forming operation of not forming the developer image on the surface of the photosensitive member 1. Further, according to the present embodiment, the controller 202 controls the charging current detector 61 to perform a detection operation of detecting the charging current while the surface of the photosensitive member 1 having passed through the development portion P3 after being charged by the charger 2 passes through the charging portion P1 during the non-image forming operation, and the controller 202 is configured to control at least one of the charging voltage applicator 71, the exposer 3, and the development voltage applicator 72 to change the development contrast based on the charging current value $I_A$ detected by the detection operation performed before the current detection operation and the charging current value $I_B$ detected by the current detection operation, the development contrast being the potential difference between the potential of the electrostatic latent image at the development portion P3 and the development voltage. According to the present embodiment, in a case where the $I_B$ is greater than the $I_A$, the controller 202 controls at least one of the charging voltage applicator 71, the exposer 3, and the development voltage applicator 72 to increase the absolute value of the development contrast. Especially, according to the present embodiment, in a case where the $I_B$ is greater by a predetermined value or more than the $I_A$, the controller 202 controls at least one of the charging voltage applicator 71, the exposer 3, and the development voltage applicator 72 to increase the absolute value of the development contrast. In a case where the $I_B$ is less than the $I_A$, the controller 202 may control at least one of the charging voltage applicator 71, the exposer 3, and the development voltage applicator 72 to decrease the absolute value of the development contrast.

According to the present embodiment, each time a printing operation that is a sequence of operations of forming an image on one or more recording materials P is performed, the controller 202 executes the detection operation during the non-image forming operation before the first image forming operation in the printing operation. In the present embodiment, the $I_A$ is the charging current value detected by the previous detection operation. In the present embodiment, the development device 4 is attachable to and detachable from the body 110 of the image forming apparatus 100. Especially, in the present embodiment, the unit (process cartridge) 7 including the photosensitive member 1 and the development device 4 is attachable to and detachable from the body 110 of the image forming apparatus 100 as one piece. According to the present embodiment, the development member 41 is brought into contact with the surface of the photosensitive member 1 and forms the development portion P3.

As described above, according to the present embodiment, dilution due to a change in charging characteristics of toner is prevented by detecting the change in the charging characteristics of the toner in the development device 4. With this configuration, even in a case where, for example, the development device 4 is replenished with new toner by refilling performed outside the body 110 of the image forming apparatus 100, the image forming condition (development contrast) is changed based on the charging characteristics of the toner in the development device 4, which prevents dilution and the like. Conventional image forming apparatuses are sometimes provided with a charging current detector to control, for example, charging voltage. According to the present embodiment, the need for including a new power supply or circuit in the image forming apparatus 100 is reduced, and the above-described effects are produced with a simple configuration.

A second embodiment of the present disclosure will be described below. Basic configurations and operations of an image forming apparatus according to the present embodiment are similar to those of the image forming apparatus according to the first embodiment. Thus, each component of the image forming apparatus according to the present embodiment that is similar or corresponds to a component of the image forming apparatus according to the first embodiment is assigned the same reference numeral as in the first embodiment, and the redundant detailed descriptions are omitted.

Outline of Present Embodiment

The control to prevent dilution that is caused by new toner replenishment to the development device 4 according to the first embodiment is described above. A control to prevent banding that is caused by new toner replenishment to the development device 4 according to the present embodiment will be described below.

Figure 7:
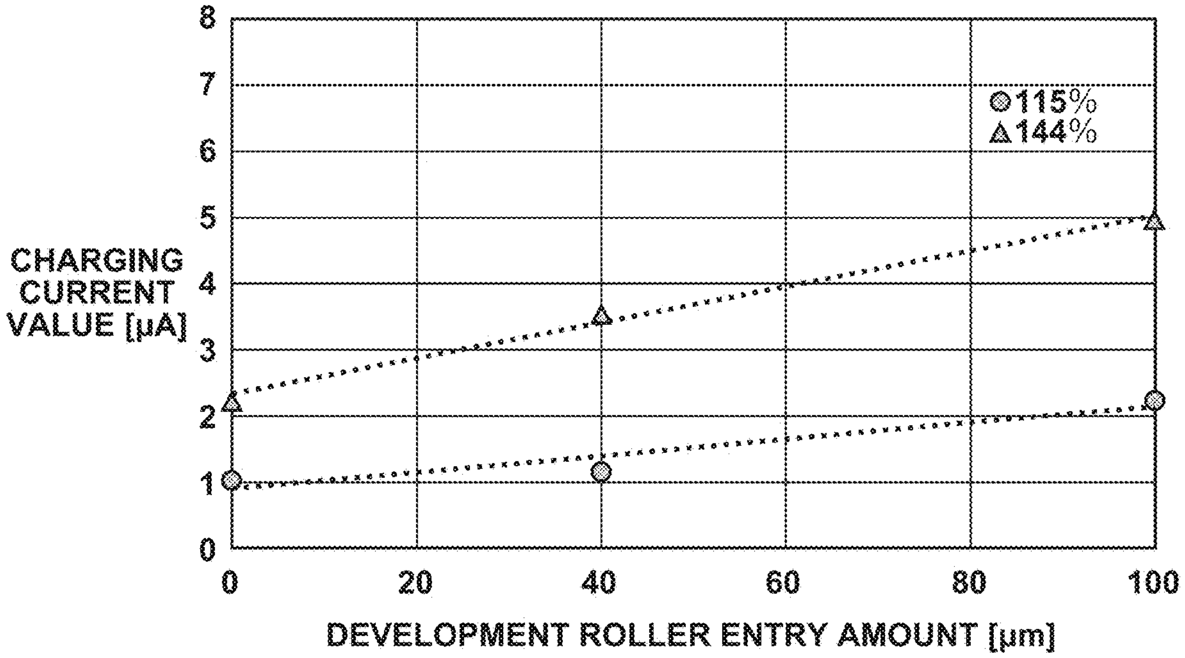
FIG. 7 is a graph illustrating a relationship between amounts of entry of a development roller and charging current values.

FIG. 7 is a graph illustrating an example of a relationship between amounts of entry of the development roller 41 to the photosensitive member 1 and charging current values. In FIG. 7, the relationships in a case where the ratio (hereinafter, also referred to as "D-D circumferential speed ratio") of the circumferential speed (surface movement speed) of the development roller 41 to the circumferential speed (surface movement speed) of the photosensitive member 1 is 115% and a case where the ratio is 144% are illustrated. The D-D circumferential speed ratio is expressed by the following formula: (circumferential speed of development roller/circumferential speed of photosensitive member)×100. The amount of entry (hereinafter, sometimes referred to simply as "amount of entry") of the development roller 41 into the photosensitive member 1 can be indicated as an amount by which the elastic layer of the development roller 41 is depressed by the photosensitive member 1.

FIG. 7 indicates that the greater the amount of entry, the greater the charging current value (the surface potential of the photosensitive member 1 has a tendency to decrease), and the smaller the amount of entry, the smaller the charging current value (the surface potential of the photosensitive member 1 does not have a tendency to decrease). FIG. 7 indicates that an increase in the D-D circumferential speed ratio heightens the tendency to increase the charging current value in a case where the amount of entry is great as described above.

A mechanism by which differences arise in changes in the charging current value in accordance with the amount of entry as described above will be described below with reference to FIG. 5. In a case where the amount of entry is great, the rotational force of the toner t increases, and the frictional charging force between the particles of the toner t and the photosensitive member 1 increases, which causes the negative charges e on the surface of the photosensitive member 1 to easily move to the development roller 41. On the other hand, in a case where the amount of entry is small, the rotational force of the toner t decreases, and the frictional charging force between the particles of the toner t and the photosensitive member 1 decreases, which causes the negative charges e on the surface of the photosensitive member 1 to have difficulty in moving to the development roller 41. Thus, in a case where the amount of entry is great, the degree to which the surface potential of the photosensitive member 1 decreases at the downstream side of the development portion P3 in the rotation direction of the photosensitive member 1 increases as in the first embodiment described above, so that the charging current for charging the photosensitive member 1 next time increases. On the other hand, in a case where the amount of entry is small, the degree to which the surface potential of the photosensitive member 1 decreases at the downstream side of the development portion P3 in the rotation direction of the photosensitive member 1 decreases as in the first embodiment described above, so that the charging current for charging the photosensitive member 1 next time decreases.

Due to the foregoing relationship, in a case where the amount of entry changes due to a variation in the outer diameter of the development roller 41, the surface potential of the photosensitive member 1 changes in the development portion P3, and this is often visualized as banding, which is uneven development that occurs at the rotation period of the development roller 41. An increase in the D-D circumferential speed ratio increases the rotational force of the toner, which causes the negative charges e on the surface of the photosensitive member 1 to easily move to the development roller 41, and consequently, banding becomes significant. Specifically, in order to prevent banding, reduction in the D-D circumferential speed ratio is effective. Especially, because new toner has the effect of increasing the movement amount of negative charge, reduction in the D-D circumferential speed ratio when new toner has been replenished is effective.

Thus, according to the present embodiment, in a case where it is determined that there is an increase in charging characteristics of the toner in the development device 4, based on a result of the charging current detection, the controller 202 adjusts the D-D circumferential speed ratio to decrease the ratio.

<Configuration of Image Forming Apparatus>

Figure 8:
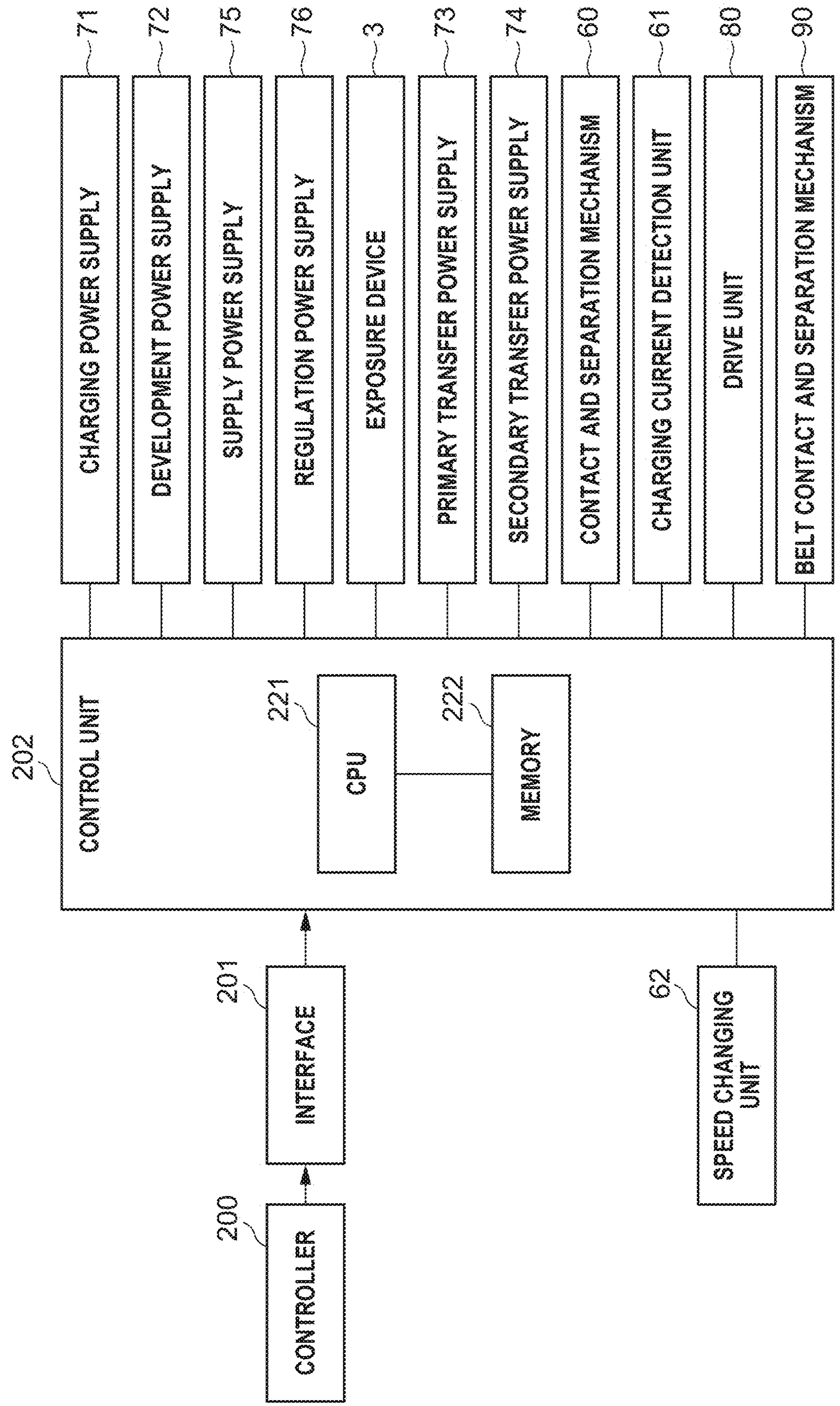
FIG. 8 is a block diagram illustrating a control configuration of an image forming apparatus according to a second embodiment.

FIG. 8 is a block diagram illustrating a control configuration of a major portion of the image forming apparatus 100 according to the present embodiment. The control configuration of the image forming apparatus 100 according to the present embodiment in FIG. 8 is roughly similar to the control configuration of the image forming apparatus 100 according to the first embodiment in FIG. 3. According to the present embodiment, the image forming apparatus 100 further includes a speed regulator (speed changing circuit) 62. The speed regulator 62 controls the rotation speed of the development roller 41 variably. According to the present embodiment, the speed regulator 62 is disposed independently of each image forming unit S.

The speed regulator 62 is capable of controlling the rotation speed of the development roller 41 variably to change the D-D circumferential speed ratio within the range of 100% to 150%. According to the present embodiment, a default setting of the D-D circumferential speed ratio for the body 110 of the image forming apparatus 100 and the process cartridge 7 in new condition is 144%. In this setting, the development roller 41 rotates faster than the photosensitive member 1, which allows a sufficient amount of toner to be quickly supplied to the photosensitive member 1. In contrast, if an amount of toner coverage on the development roller 41 is increased, regulation failure may occur due to insufficient charge application to the toner by the development blade 43, and fog (phenomenon where toner adheres to non-image portions) may occur. Thus, it is desirable not to increase the amount of toner coverage on the development roller 41 for the purpose of increasing the amount of toner supply to the photosensitive member 1. In the present embodiment, in a case where it is determined that new toner is replenished based on a change in charging characteristics of the toner based on a result of the charging current detection, the speed regulator 62 changes the D-D circumferential speed ratio from 144% to 115%.

This is intended to reduce a change in the surface potential of the photosensitive member 1 by reducing the D-D circumferential speed ratio, based on the relationship between the D-D circumferential speed ratio and the ease of banding occurrence, which is described above with reference to FIG. 7, in order to prevent banding.

<Process of Controlling Image Forming Conditions Based on Charging Current Detection>

Figure 9:
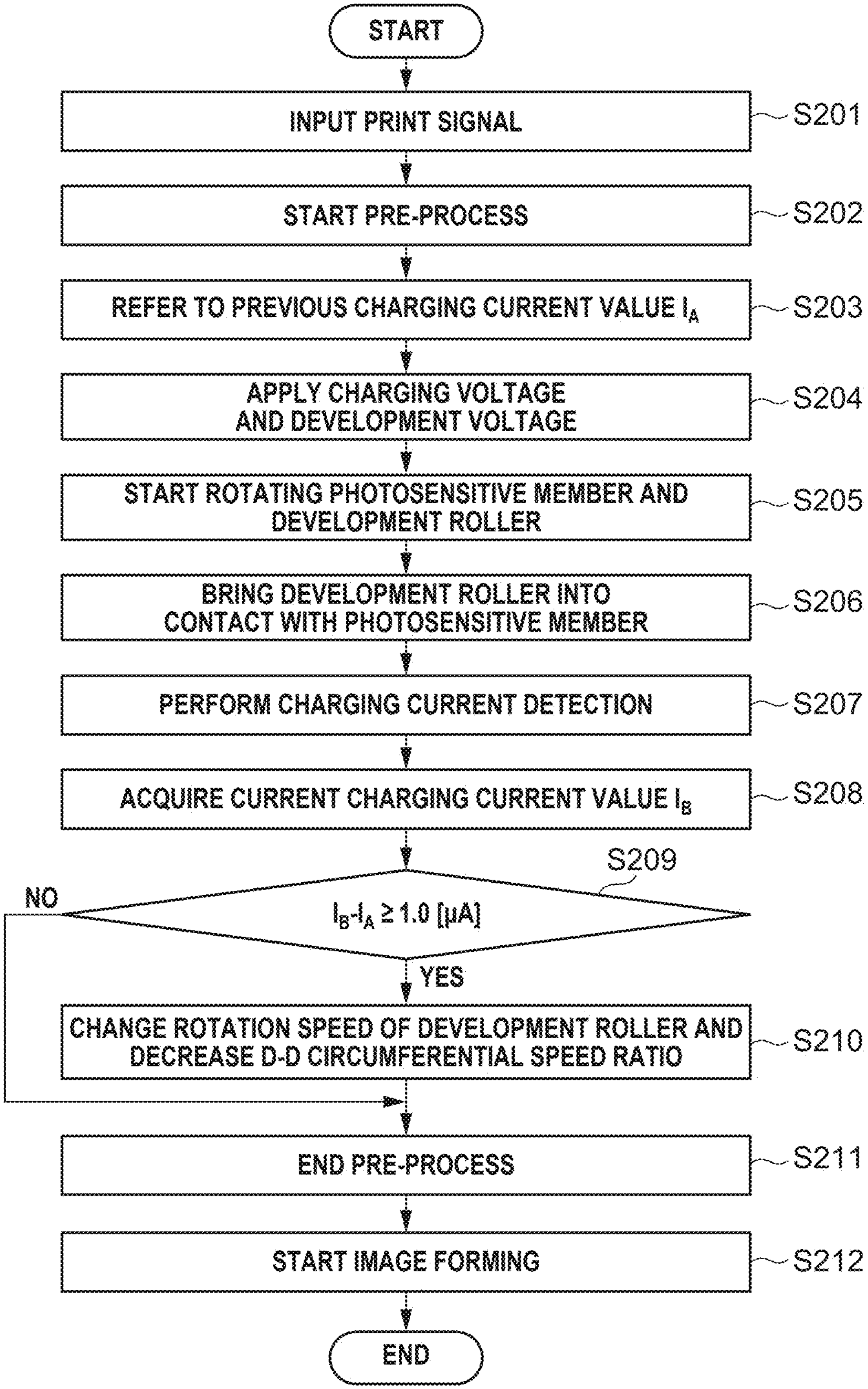
FIG. 9 is a flowchart illustrating a control according to the second embodiment.

FIG. 9 is a flowchart illustrating an outline of a process of controlling the image forming conditions based on charging current detection according to the present embodiment. While the control of the image forming conditions based on charging current detection according to the present embodiment described below with reference to FIG. 9 is performed for each image forming unit S, the following description will focus only on one image forming unit S. In the control process according to the present embodiment in FIG. 9, redundant descriptions of steps similar to those in the control process according to the first embodiment in FIG. 6 are sometimes omitted.

Steps S201 to S209 in FIG. 9 are similar to steps S101 to S109 in FIG. 6.

Then, according to the present embodiment, in step S209, in a case where the controller 202 determines that the difference (=$I_B$−$I_A$) between the charging current values is greater than or equal to the predetermined threshold (in a case where $I_B$ is greater by the predetermined value or more than $I_A$) (YES in step S209), the processing proceeds to step S210. In step S210, the controller 202 changes the rotation speed of the development roller 41 to change the D-D circumferential speed ratio from 144% to 115% in order to prevent banding that is caused by new toner. In step S211, the controller 202 ends the pre-process, and in step S212, the controller 202 starts image forming. In step S209, in a case where the controller 202 determines that the difference (=$I_B$−$I_A$) between the charging current values is not greater than or equal to the predetermined threshold (the difference is less than the predetermined threshold) (NO in step S209), the processing proceeds step S211. In step S211, the controller 202 ends the pre-process without changing the rotation speed of the development roller 41, and in step S212, the controller 202 starts image forming.

Changes similar to the modified examples of the first embodiment described above can be made to the present embodiment. For example, the controller 202 may change the image forming condition (D-D circumferential speed ratio) in a case where it is determined that there is a decrease in charging characteristics of the toner in the development device 4, based on a result of the charging current detection, in addition to or in place of a case where it is determined that there is an increase in charging characteristics of the toner in the development device 4, based on a result of the charging current detection. In this case, the D-D circumferential speed ratio may be increased in a case where, for example, the difference between $I_A$ and $I_B$ (=$I_B$−$I_A$) is less than or equal to a predetermined threshold that is a negative value (in a case where $I_A$ is greater by a predetermined value or more than $I_B$). For example, the D-D circumferential speed ratio may be changed between three or more levels so that the greater the difference between $I_A$ and $I_B$ (=$I_B$−$I_A$), the lower the D-D circumferential speed ratio.

While only the D-D circumferential speed ratio is changed based on charging current detection in the present embodiment, the development contrast may also be changed based on charging current detection, as in the first embodiment, in addition to changing the D-D circumferential speed ratio. For example, in a case where the difference between $I_A$ and $I_B$ (=$I_B$−$I_A$) is greater than or equal to the predetermined threshold, the development contrast may be increased, and the D-D circumferential speed ratio may be decreased. Further, in a case where the difference between $I_A$ and $I_B$ (=$I_B$−$I_A$) is less than or equal to the predetermined threshold that is a negative value, the development contrast may be decreased, and the D-D circumferential speed ratio may be increased.

A change in the amount of toner charge while focusing on new toner replenishment according to the present embodiment is described above, but this is not a limitation. Control for a case where the photosensitive member 1 is replaced may also be performed. For example, in a case where the photosensitive member 1 is replaced with a new photosensitive member 1, because the new photosensitive member 1 has low electrical resistance, a large current flows. As a result, it becomes more susceptible to the effects of variation in the outer diameter of the development roller 41 (change in the amount of entry). Thus, for example, as in the present embodiment, the D-D circumferential speed ratio may be decreased in a case where there is an increase in the charging current and it is determined that the photosensitive member 1 is replaced. This makes it possible to prevent banding.

While the D-D circumferential speed ratio is changed by changing the rotation speed of the development roller 41 in the present embodiment, the D-D circumferential speed ratio may be changed by changing the rotation speed of the photosensitive member 1 as in the present embodiment. In this case, the speed regulator 62 is configured to control the rotation speed of the photosensitive member 1 variably. The D-D circumferential speed ratio may be changed as in the present embodiment by changing both the rotation speed of the development roller 41 and the rotation speed of the photosensitive member 1. In this case, the speed regulator 62 is configured to control the rotation speed of the development roller 41 and the rotation speed of the photosensitive member 1 variably.

As described above, in the present embodiment, the image forming apparatus 100 includes the speed regulator 62 for changing the rotation speed of the development member 41 and the controller 202 capable of controlling the charging voltage applicator 71 and the speed regulator 62. Further, in the present embodiment, the controller 202 performs control to cause the charging current detector 61 to perform the charging current detection operation while the surface of the photosensitive member 1 having passed through the development portion P3 after being charged by the charger 2 passes through the charging portion P1 during the non-image forming operation, and the controller 202 performs control to cause the speed regulator 62 to change the circumferential speed ratio (D-D circumferential speed ratio), which is the ratio of the circumferential speed of the development member 41 to the circumferential speed of the photosensitive member 1, based on the charging current value $I_A$ detected by a detection operation performed before the detection operation in the current operation and the charging current value $I_B$ detected by the detection operation in the current operation. According to the present embodiment, the controller 202 controls the speed regulator 62 to decrease the circumferential speed ratio in a case where the $I_B$ is greater than the $I_A$. Especially, according to the present embodiment, the controller 202 controls the speed regulator 62 to decrease the circumferential speed ratio in a case where the $I_B$ is greater by a predetermined value or more than $I_A$. The controller 202 may control the speed regulator 62 to increase the circumferential speed ratio in a case where the $I_B$ is smaller than the $I_A$.

As described above, according to the present embodiment, banding due to a change in charging characteristics of toner is prevented by detecting the change in the charging characteristics of the toner in the development device 4. Thus, even in a case where, for example, the development device 4 is replenished with new toner by refilling performed outside the body 110 of the image forming apparatus 100, the image forming condition (D-D circumferential speed ratio) is changed based on the charging characteristics of the toner in the development device 4, which prevents banding and the like.

A third embodiment of the present disclosure will be described below. Basic configurations and operations of an image forming apparatus according to the present embodiment are similar to those of the image forming apparatus according to the first embodiment. Thus, each component of the image forming apparatus according to the present embodiment that is similar or corresponds to a component of the image forming apparatus according to the first embodiment is assigned the same reference numeral as in the first embodiment, and redundant detailed descriptions are omitted.

<Outline of Present Embodiment>

The control according to the first embodiment to prevent dilution that is caused by replenishing the development device 4 with new toner is described above. A configuration according to the present embodiment in which the replenishment of the development device 4 is detected with high accuracy will be described below.

<Configuration of Image Forming Apparatus according to Present Embodiment>

Figure 10:
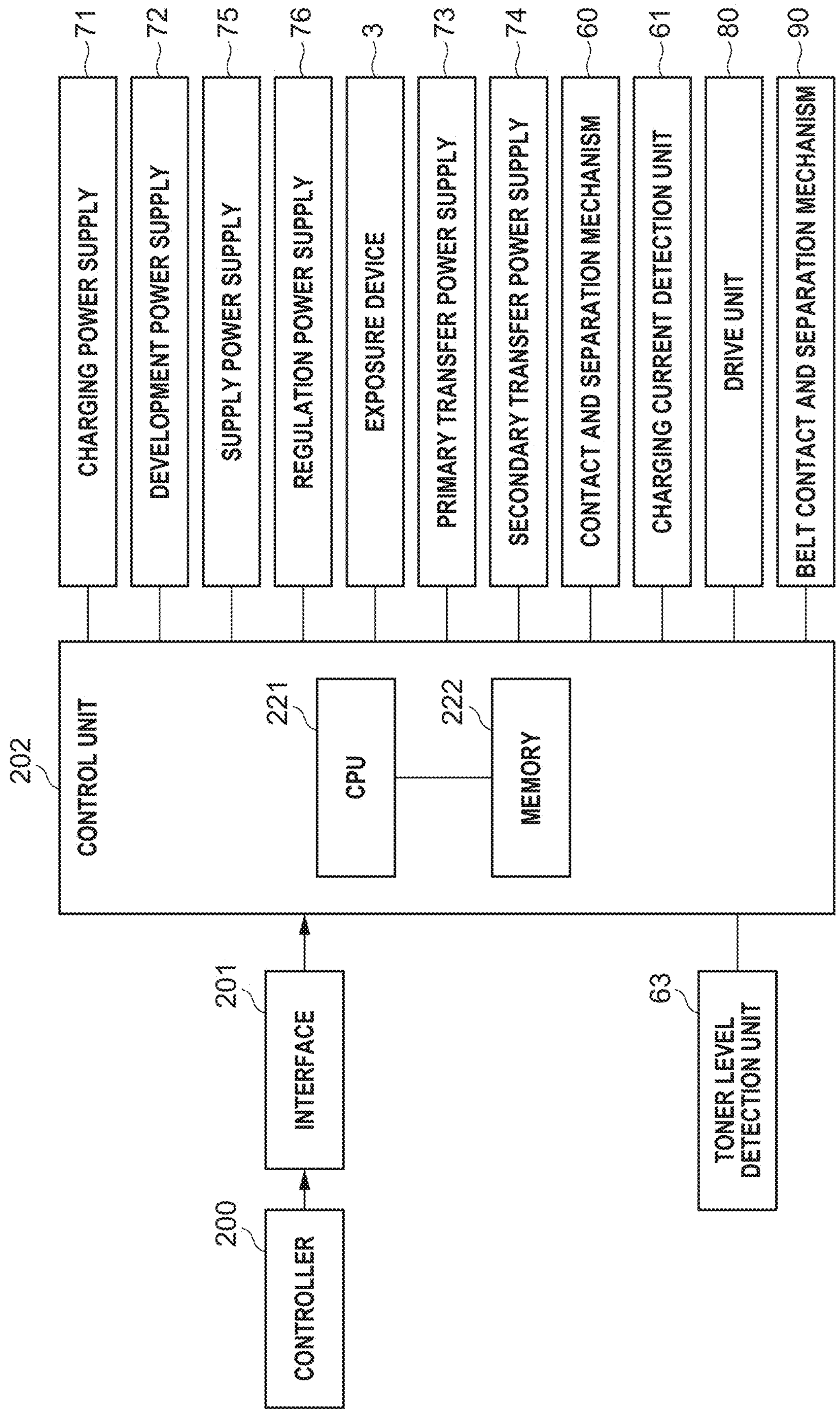
FIG. 10 is a block diagram illustrating a control configuration of an image forming apparatus according to a third embodiment.

FIG. 10 is a block diagram illustrating a control configuration of a major portion of the image forming apparatus 100 according to the present embodiment.

The control configuration of the image forming apparatus 100 according to the present embodiment in FIG. 10 is roughly similar to the control configuration of the image forming apparatus 100 according to the first embodiment in FIG. 3. According to the present embodiment, the image forming apparatus 100 further includes a toner level detector (toner level detection circuit) 63 serving as a developer level detector capable of detecting a toner level as a developer amount in the toner storage chamber 45*b* of the development device 4. In the present embodiment, the toner level detector 63 is disposed independently of each image forming unit S.

The toner level detector 63 in the present embodiment is capable of detecting whether toner is replenished, in real time. A result of the detection of the toner level detector 63 is stored in the storage unit (or the memory 222) in the toner level detector 63.

The toner level detector 63 can use, for example, a publicly known developer level detection method. Examples of developer level detection methods that can be used include a capacitance method and a light transmission method. The capacitance method refers to a method with which developer level information is acquired using an electrode for detecting capacitance that changes according to the developer level inside a development device. The light transmission method refers to a method with which a developer level is acquired based on, by using a light source for emitting light into a development device and a light receiving unit for receiving light transmitted through the interior of the development device, changes in light-receiving state (such as whether light is received, light reception amount, light reception time) of the light receiving unit. A weight detection method with which developer level information is acquired based on changes in weight of a development device is also applicable.

<Process of Controlling Image Forming Conditions Based on Toner Level Detection and Charging Current Detection>

Figure 11:
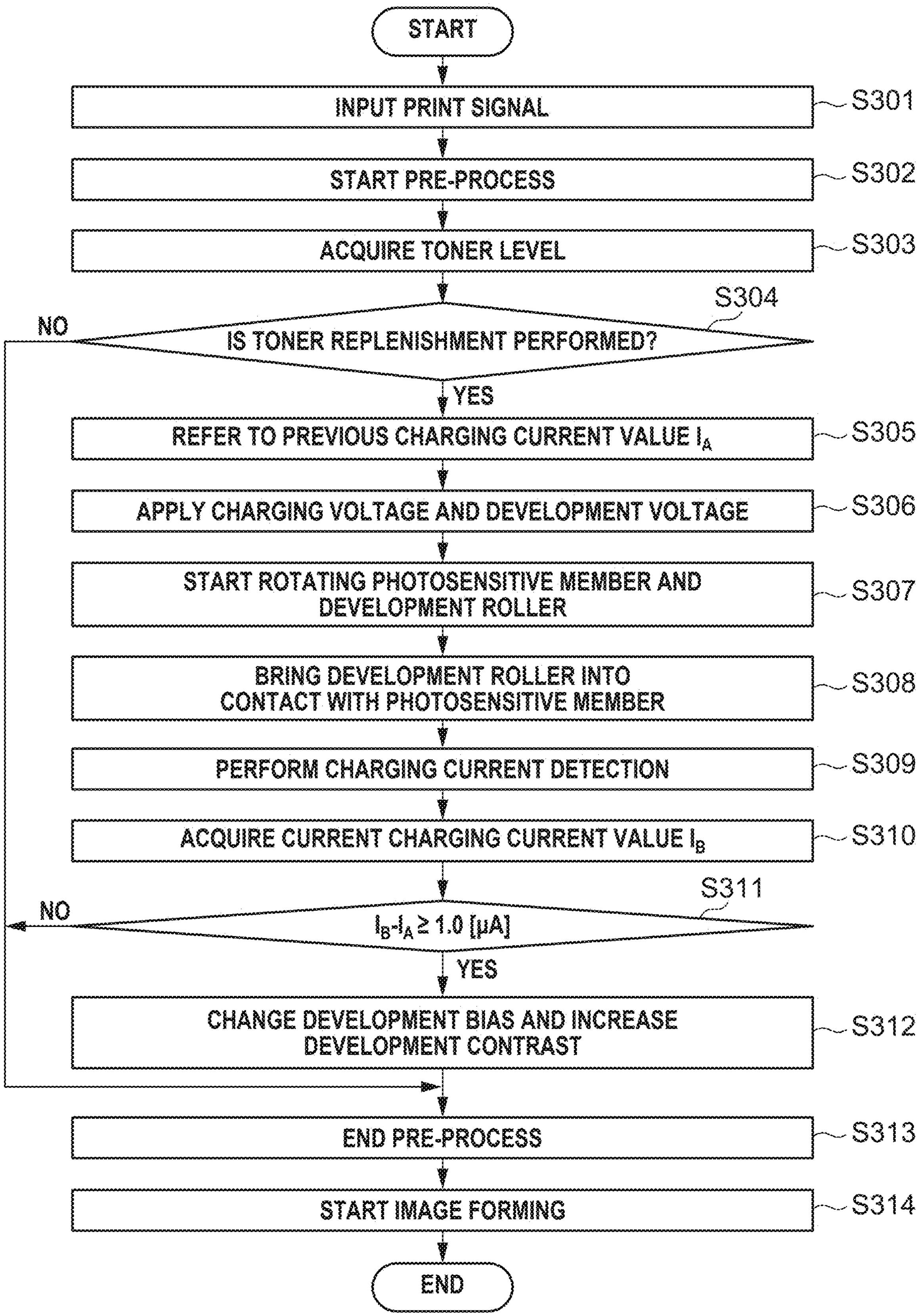
FIG. 11 is a flowchart illustrating a control according to the third embodiment.

A control of the image forming conditions based on toner level detection and charging current detection according to the present embodiment will be described below. FIG. 11 is a flowchart illustrating an outline of a process of controlling the image forming conditions based on toner level detection and charging current detection according to the present embodiment. While the control according to the present embodiment described below with reference to FIG. 11 is performed for each image forming unit S, the following description will focus only on one image forming unit S. In the control process according to the present embodiment in FIG. 11, redundant descriptions of steps similar to those in the control process according to the first embodiment in FIG. 6 are sometimes omitted.

In step S301, a print signal is input from an external apparatus to the controller 202 via the controller 200 and the interface 201. In step S302, the controller 202 starts the pre-process. In step S303, the controller 202 acquires a result of the detection of the toner level detector 63. In step S304, the controller 202 determines whether the development device 4 has been replenished with toner, based on a result of the previous detection and a result of the current detection. Specifically, in a case where the toner level in the development device 4 increases by a predetermined value or more, it is determined that the development device 4 has been replenished with toner. In a case where the toner level detector 63 detects that the development device 4 has been replenished with toner, a toner replenishment signal may be input to the controller 202.

In step S304, in a case where the controller 202 determines that the development device 4 has been replenished with toner (YES in step S304), the processing proceeds to step S305. Specifically, the processing proceeds to the control of the image forming condition (development contrast) based on charging current detection as in the first embodiment. On the other hand, in step S304, in a case where the controller 202 determines that the development device 4 has not been replenished with toner (NO in step S304), the processing proceeds to step S313. Specifically, the charging current detection for the control of the image forming condition (development contrast) is skipped. Steps S305 to S314 in FIG. 11 are similar to steps S103 to S112 in FIG. 6. However, a result of the detection of the charging current value $I_A$ in the previous operation according to the present embodiment is, for example, a detection result of a previous charging current value detected at a predetermined frequency and stored in the storage unit (or the memory 222) in the charging current detector 61. Alternatively, for example, the charging current value detection may be performed each time the pre-process is performed as in the first embodiment, and the image forming condition (development contrast) may be changed only in a case where $I_B$ is greater by a predetermined value or more than $I_A$ and an increase in the toner level is detected by the toner level detector 63.

A case where the control to prevent dilution due to new toner replenishment is performed in the present embodiment as in the first embodiment is described above as an example. However, this is not a limitation, and the present embodiment is also applicable in cases where the control to prevent banding due to new toner replenishment is performed as in the second embodiment. As described above in the second embodiment, the present embodiment is also applicable in cases where the control to prevent dilution and banding due to new toner replenishment is performed.

For example, replenishment of the development device 4 with toner may be detected in real time with a toner replenishment configuration described below. Then, in a case where toner replenishment is detected, for example, during continuous image forming, the image forming conditions (development contrast, the D-D circumferential speed ratio) may be changed in the sheet interval process.

As described above, according to the present embodiment, the developer level detector (toner level detector) 63 for detecting the toner level inside the developer storage portion (toner storage chamber) 45*b* is included, and in a case where an increase in the toner level inside the developer storage portion 45*b* is detected by the developer level detector 63, the controller 202 performs control to change the image forming conditions (development contrast, the D-D circumferential speed ratio), based on the charging current value $I_A$ detected by the charging current value detection operation performed before the detection of the increase in the toner level and the charging current value $I_B$ detected by the detection operation performed after the detection of the increase in the toner level.

As described above, according to the present embodiment, detection that toner has been replenished is reliably performed. Also, a change in the amount of charge on the toner is detected, whereby dilution and banding due to a change in charging characteristics of toner are reliably prevented.

Next, a fourth embodiment of the present disclosure will be described below. Each component of the image forming apparatus according to the present embodiment that is similar or corresponds to a component of the image forming apparatus according to the first embodiment is assigned the same reference numeral as in the first embodiment, and the redundant detailed descriptions are omitted.

Cases where replenishment of the development device 4 with toner is performed outside the body 110 of the image forming apparatus 100 according to the embodiments are described above. However, the present disclosure is not limited to the above-described forms and is also applicable in a case where replenishment of the development device 4 with toner is performed inside the body 110 of the image forming apparatus 100.

Figure 12:
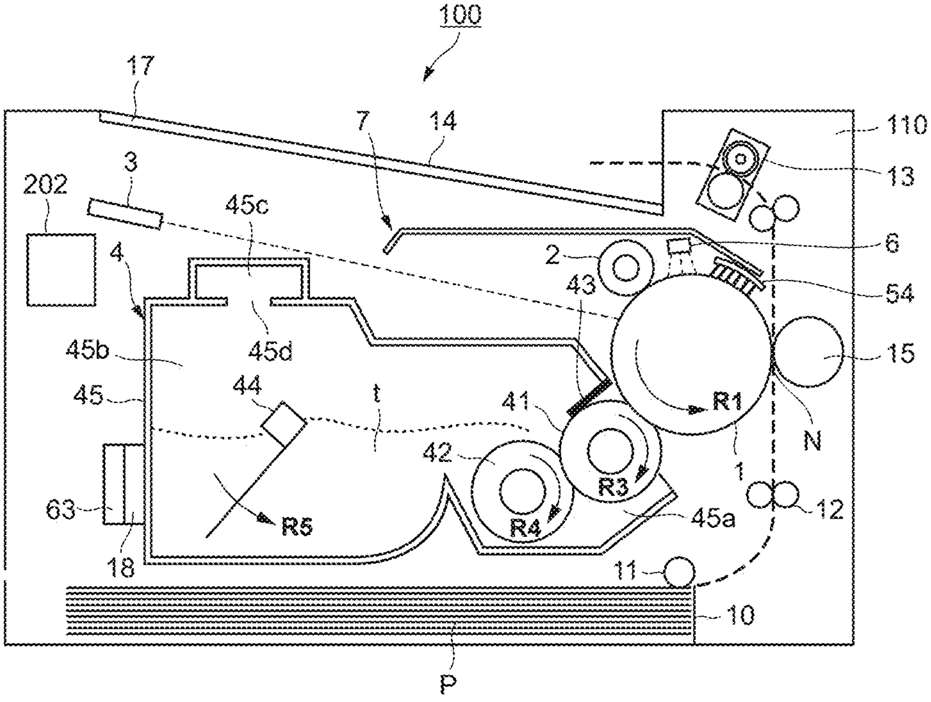
FIG. 12 is a schematic cross-sectional view illustrating an image forming apparatus according to a fourth embodiment.

FIG. 12 is a schematic cross-sectional view illustrating the image forming apparatus 100 according to the present embodiment. The image forming apparatus 100 according to the present embodiment is a monochrome laser printer capable of forming black monochrome images on sheet-shaped recording materials P using an electrophotographic method.

The photosensitive member (photosensitive drum) 1 is driven to rotate in an arrow R1 direction (anti-clockwise direction) in FIG. 12. The surface of the photosensitive member 1 rotating is uniformly charged to a predetermined potential of a predetermined polarity (negative polarity according to the present embodiment) by the charging roller 2. The charged surface of the photosensitive member 1 is scanned and exposed by the exposer (scanner) 3, and an electrostatic latent image (electrostatic image) is formed on the photosensitive member 1. The development device 4 supplies toner as a developer to the electrostatic latent image formed on the photosensitive member 1 and develops (visualizes) the electrostatic latent image, and a toner image is formed on the photosensitive member 1. The development device 4 includes the development roller 41, the supply roller 42, the development blade 43, the toner conveyance member 44, and the development container 45 (the development chamber 45*a*, the toner storage chamber 45*b*). In the development container 45, the toner t is stored. The toner t is a non-magnetic one-component developer. In the present embodiment, the normal charging polarity of the toner t, which is the major charging polarity of the toner t during development, is negative.

A transfer roller 15 is disposed opposite to the photosensitive member 1. The transfer roller 15 is a roller-type transfer member serving as a transfer unit. The transfer roller 15 is brought into contact with the photosensitive member 1 at a predetermined contact pressure and forms a transfer portion N. At the transfer portion N, the toner image formed on the photosensitive member 1 is transferred onto a recording material P being held and conveyed by the photosensitive member 1 and the transfer roller 15. During the transfer, a predetermined transfer voltage (transfer bias) is applied to the transfer roller 15. The predetermined transfer voltage is a DC voltage of the opposite polarity (positive polarity according to the present embodiment) to the normal charging polarity of the toner. The recording material P stored in the cassette 10 is fed from the cassette 10 by the feed rollers 11 and conveyed to the registration rollers 12. The recording material P is conveyed to the transfer portion N in synchronization with the toner image on the photosensitive member 1 by the registration rollers 12. The recording material P on which the toner image has been transferred is conveyed to the fixing device 13, and after the toner image is fixed, the recording material P is ejected (output) to the tray 14 disposed outside the body 110 of the image forming apparatus 100.

Meanwhile, the toner (transfer residual toner) that is not transferred onto the recording material P during the transfer process and remains on the photosensitive member 1 is removed from the photosensitive member 1 as described below. The surface of the photosensitive member 1 after the transfer process undergoes pre-exposure by the pre-exposure device 6 to eliminate electricity. The transfer residual toner is negatively charged through discharge at a charging portion. As the photosensitive member 1 rotates, the transfer residual toner that is negatively charged at the charging portion arrives at a development portion. Then, the transfer residual toner adhering to non-image portion on the photosensitive member 1 moves to the development roller 41 at the development portion and is collected by the development device 4. The transfer residual toner adhering to image portion on the photosensitive member 1 forms a toner image together with the toner moved from the development roller 41 to the photosensitive member 1. Then, the toner is transferred onto the recording material P at the transfer portion N and removed from the photosensitive member 1. Paper dust generated from the recording material P and moved from the recording material P to the photosensitive member 1 during the transfer process is removed by a brush member 54.

According to the present embodiment, the photosensitive member 1, the charging roller 2 serving as a process unit acting on the photosensitive member 1, the development device 4, the pre-exposure device 6, and the brush member 54 are integrated into the process cartridge 7 attachable to and detachable from the body 110 of the image forming apparatus 100 as one piece.

Figure 13A:
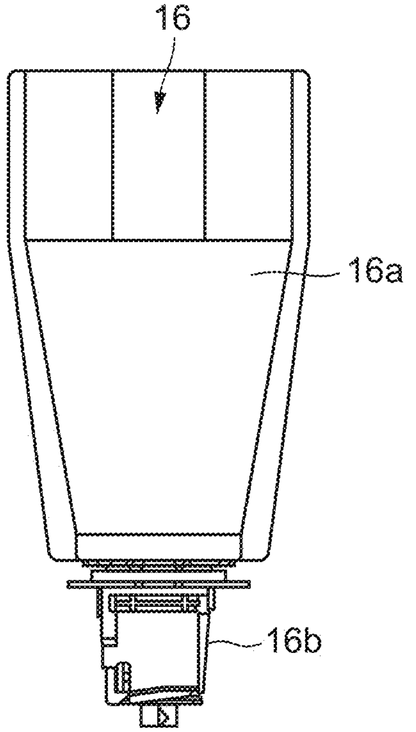
FIG. 13A is a front view illustrating a toner pack according to the fourth embodiment.
Figure 13B:
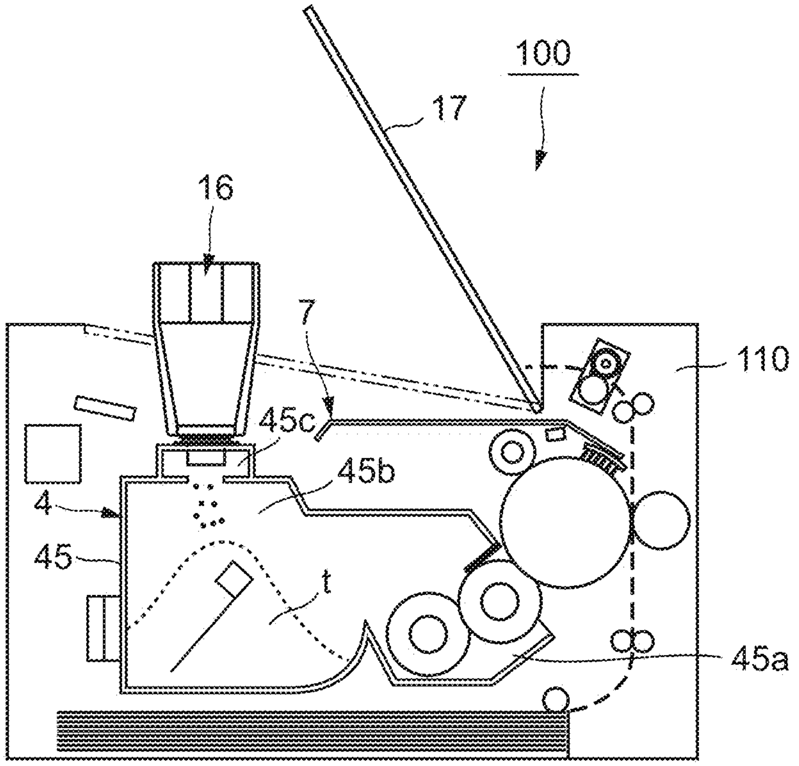
FIG. 13B is a schematic cross-sectional view illustrating a method of supplying toner from the toner pack to a development device.

FIG. 13A is a schematic front view illustrating a toner pack 16 serving as a toner supply container according to the present embodiment. FIG. 13B is a schematic cross-sectional view illustrating a state where the toner pack 16 is attached to the development container 45 of the development device 4.

As illustrated in FIG. 12, the development container 45 includes a supply protrusion portion 45*c* formed as a connecting portion. The supply protrusion portion 45*c* has a hollow interior and is formed to communicate with the toner storage chamber 45*b* in the development container 45 through a supply opening 45*d*. A top cover 17 is disposed to an upper portion of the body 110 of the image forming apparatus 100 so that the top cover 17 can open and close. An upper surface of the top cover 17 serves as the tray 14.

As illustrated in FIG. 13A, according to the present embodiment, the toner pack 16 includes a pouch 16*a*, which is plastic and deformable, and a joint portion 16*b* at an end portion of the pouch 16*a*. The interior of the pouch 16*a* and the interior of the joint portion 16*b* are in communication with each other. As illustrated in FIG. 13B, the image forming apparatus 100 is configured in such a manner that opening the top cover 17 upward exposes the supply protrusion portion 45*c* to the outside. The toner pack 16 is attachable to an end portion of the supply protrusion portion 45*c*, and in a case where the toner pack 16 is attached to the supply protrusion portion 45*c*, the toner can be supplied from the toner pack 16 to the toner storage chamber 45*b*. In a state where the top cover 17 is opened, the joint portion 16*b* is connected to the supply protrusion portion 45*c*, so that the toner pack 16 is attached to the supply protrusion portion 45*c* with at least part of an end portion of the pouch 16*a* on the opposite side to the joint portion 16*b* exposed to the outside of the image forming apparatus 100.

In response to the toner pack 16 being attached to the supply protrusion portion 45*c*, the interior of the toner pack 16 (the pouch 16*a*, the joint portion 16*b*) and the interior of the supply protrusion portion 45*c* are in communication with each other. Then, the toner stored in the toner pack 16 is ejected into the supply protrusion portion 45*c* through an opening portion of the joint portion 16*b* of the toner pack 16 and supplied from the supply protrusion portion 45*c* into the toner storage chamber 45*b* through the supply opening 45*d*.

As described above, according to the present embodiment, the development device 4 includes the connecting portion (supply protrusion portion) 45*c* to which the supply container (toner pack) 16 storing the developer to be supplied to the developer storage portion (toner storage chamber) 45*b* is removably attached, and the developer can be supplied from the supply container 16 to the developer storage portion 45*b*.

While the toner supply container includes the deformable plastic pouch according to the present embodiment, the present disclosure is not so limited. For example, the toner supply container may include a bottle container with a substantially conical or cylindrical shape. For example, the toner supply container may include a paper container made of paper. In a case where the toner supply container is the toner pack 16 as in the present embodiment or a paper container, a suitable method for ejecting the toner from the toner supply container is that a user squeezes the container with fingers, whereas in a case where the toner supply container is a bottle container, a suitable ejection method is that the user taps and shakes the container. In order to eject the toner from the bottle container, an ejection mechanism may be disposed to the bottle container. The ejection mechanism may be engaged with a drive mechanism of the body 110 of the image forming apparatus 100 to receive driving from the drive mechanism. In order to prevent toner leakage from the toner supply container, a rotary or slide-type shutter member may be disposed to the toner supply container. The shutter member may be configured to be broken at the time of being attached to the supply opening 45*d* of the development device 4 or may be a removable cover structures such as a seal.

The development device 4 includes a light guide member 18. The image forming apparatus 100 includes the toner level detector 63. According to the present embodiment, the toner level detector 63 includes a light emitting element, a light receiving element, and a board on which the light emitting element and the light receiving element are disposed.

The toner level detector 63 detects the toner level based on the duration of light reception by the light receiving element from the light emitting element. In a case where the toner level in the toner storage chamber 45*b* that is detected by the toner level detector 63 is lower than or equal to a predetermined value, the controller 202 displays information for prompting the user to supply toner on an external apparatus or a display unit of the image forming apparatus 100.

<Control of Image Forming Conditions Based on Charging Current Detection>

Even in the image forming apparatus 100 with the toner supply configuration according to the present embodiment, there is a possibility of a change in charging characteristics of the toner in the development device 4 after toner is supplied.

Thus, with the control for the image forming conditions (development contrast, the D-D circumferential speed ratio) based on charging current detection according to the first to third embodiments described above, the image forming apparatus 100 with the toner supply configuration according to the present embodiment produces effects similar to those of the first to third embodiments.

While specific embodiments have been described, the present disclosure is not limited to the above-described embodiments.

While the image forming apparatus 100 is a laser printer according to the above-described embodiments, the present disclosure is not limited to the laser printers. Image forming apparatuses are apparatuses that form images on recording materials using an electrophotographic image forming method. Examples of image forming apparatuses include copying machines, printers (laser beam printers, light emitting diode (LED) printers), facsimile apparatuses, word processors, and multi-function peripherals (multi-function printers) thereof.

While the development device (development unit) 4 and the photosensitive unit 8 are integrated into the process cartridge 7 in the above-described embodiments, the present disclosure is not limited to those described above. The development device 4 and the photosensitive unit 8 may respectively configured as a development cartridge and a photosensitive member cartridge that are attachable to and detachable from the body of the image forming apparatus 100. The development device 4 and the photosensitive member 1 may each be attachable to and detachable from the body of the image forming apparatus 100 independently. While the process cartridge 7 is attachable to and detachable from the image forming apparatus 100 according to the above-described embodiments, the present disclosure is also applicable to an image forming apparatus including a process unit similar to the components of the process cartridge 7 according to the above-described embodiments in a body of the image forming apparatus. In this case, only the above-described toner supply container according to the fourth embodiment may be attachable to and detachable from the body of the image forming apparatus.

While the development roller 41 is brought into contact with the surface of the photosensitive member 1 and rotates in developing an electrostatic latent image on the photosensitive member 1 as a toner image according to the above-described embodiments, the present disclosure is not limited to the above-described embodiments. The present disclosure is applicable to not only configurations in which a development member and a photosensitive member are brought into contact with each other during development but also even in a configuration in which a development member is separated from the photosensitive member during development, as long as toner is supplied onto a photosensitive member. Specifically, a development roller may be disposed facing a photosensitive member in a state of being separated from the photosensitive member to form a development portion configured to supply toner to the photosensitive member.

According to the present disclosure, a change in a charging characteristic of the toner in the development device is detected with a simple configuration, and image failures due to a change in charging characteristics of toner in a development device is prevented.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2023-135936, filed Aug. 23, 2023, which is hereby incorporated by reference herein in its entirety.

What is claimed is:

1. An image forming apparatus comprising:

a photosensitive member configured to rotate;

a charger configured to contact the photosensitive member to form a charging portion and charge a surface of the photosensitive member being rotated;

a charging voltage applicator configured to apply a charging voltage to the charger;

an exposer configured to expose the surface of the photosensitive member charged by the charger and form an electrostatic latent image on the surface of the photosensitive member;

a development member configured to rotate, form a development portion where a developer is supplied to the surface of the photosensitive member, and form a developer image on the surface of the photosensitive member by supplying the developer charged to a predetermined polarity to the electrostatic latent image on the surface of the photosensitive member at the development portion;

a development voltage applicator configured to apply, to the development member, a development voltage on the predetermined polarity with respect to a potential of the electrostatic latent image at the development portion;

a charging current detector configured to detect a charging current flowing through the charging portion during the charging of the surface of the photosensitive member by the charger; and a controller configured to control the charging voltage applicator, the exposer, and the development voltage applicator, wherein the controller is configured to control an image forming operation in which the developer image is formed on the surface of the photosensitive member, and a non-image forming operation in which the developer image is not formed on the surface of the photosensitive member, wherein the controller is configured to communicate with the charging current detector during at least one detection operation for detection of the charging current while the surface of the photosensitive member having passed through the development portion after being charged by the charger passes through the charging portion during the non-image forming operation, and wherein the controller is configured to control at least one of the charging voltage applicator, the exposer, and the development voltage applicator to change a development contrast based on a charging current value $I_A$ detected by a detection operation that is performed before a current detection operation and a charging current value $I_B$ detected by the current detection operation, the development contrast being a difference between a voltage of the electrostatic latent image at the development portion and the development voltage.

2. The image forming apparatus according to claim 1, wherein in a case where the charging current value $I_B$ is greater than the charging current value $I_A$, the controller controls at least one of the charging voltage applicator, the exposer, and the development voltage applicator to increase an absolute value of the development contrast.

3. The image forming apparatus according to claim 2, wherein in a case where the charging current value $I_B$ is greater by a predetermined value or more than the charging current value $I_A$, the controller controls at least one of the charging voltage applicator, the exposer, and the development voltage applicator to increase the absolute value of the development contrast.

4. The image forming apparatus according to claim 1, further comprising a speed regulator configured to change a rotation speed of the development member, wherein the controller is configured to control the speed regulator to change a circumferential speed ratio of a circumferential speed of the development member to a circumferential speed of the photosensitive member, based on the charging current value $I_A$ and the charging current value $I_B$.

5. The image forming apparatus according to claim 4, wherein in a case where the charging current value $I_B$ is greater than the charging current value $I_A$, the controller controls the speed regulator to decrease the circumferential speed ratio.

6. The image forming apparatus according to claim 5, wherein in a case where the charging current value $I_B$ is greater by a predetermined value or more than the charging current value $I_A$, the controller controls the speed regulator to decrease the circumferential speed ratio.

7. The image forming apparatus according to claim 1, wherein each time a printing operation including a sequence of operations of forming an image on one or more recording materials is performed, the controller is configured to perform the detection operation during the non-image forming operation that is performed before a first image forming operation in the printing operation.

8. The image forming apparatus according to claim 7, wherein the charging current value $I_A$ is the charging current value detected by a previous detection operation.

9. The image forming apparatus according to claim 1, further comprising:

a developer storage portion being configured to store the developer to be supplied to the development member; and a developer level detector configured to detect a toner level in the developer storage portion, wherein in a case where an increase in the toner level in the developer storage portion is detected by the developer level detector, the controller is configured to control the change of the development contrast based on the charging current value IA detected by the detection operation performed before the detection of the increase in the toner level and the charging current value $I_B$ detected by the detection operation after the detection of the increase in the toner level.

10. The image forming apparatus according to claim 1, further comprising:

a developer storage portion being configured to store the developer to be supplied to the development member, wherein the development member and the developer storge portion are attachable to and detachable from a body of the image forming apparatus.

11. The image forming apparatus according to claim 1, further comprising:

a developer storage portion being configured to store the developer to be supplied to the development member, wherein a unit including the photosensitive member, the development member and the development storage portion is attachable to and detachable from a body of the image forming apparatus as one piece.

12. The image forming apparatus according to claim 1, further comprising:

a developer storage portion configured to store the developer to be supplied to the development member; and a connecting portion to which a supply container storing the developer to be supplied to the developer storage portion is removably attached, wherein the developer is supplied from the supply container to the developer storage portion.

13. The image forming apparatus according to claim 1, wherein the development member is configured to contact with the surface of the photosensitive member to form the development portion.

14. An image forming apparatus comprising:

a photosensitive member configured to rotate;

a charger configured to contact the photosensitive member to form a charging portion and charge a surface of the photosensitive member being rotated;

a charging voltage applicator configured to apply a charging voltage to the charger;

an exposer configured to expose the surface of the photosensitive member charged by the charger and form an electrostatic latent image on the surface of the photosensitive member;

a development member configured to rotate, form a development portion where a developer is supplied to the surface of the photosensitive member, and form a developer image on the surface of the photosensitive member by supplying the developer to the electrostatic latent image on the surface of the photosensitive member at the development portion;

a speed regulator configured to change a rotation speed of the development member;

a charging current detector configured to detect a charging current flowing through the charging portion during the charging of the surface of the photosensitive member by the charger; and a controller configured to control the charging voltage applicator and the speed regulator, wherein the controller is configured to control an image forming operation in which the developer image is formed on the surface of the photosensitive member, and a non-image forming operation in which the developer image is not formed on the surface of the photosensitive member, wherein the controller is configured to communicate with the charging current detector during at least one detection operation for detection of the charging current while the surface of the photosensitive member having passed through the development portion after being charged by the charger passes through the charging portion during the non-image forming operation, and wherein the controller is configured to control the speed regulator to change a circumferential speed ratio of a circumferential speed of the development member to a circumferential speed of the photosensitive member, based on a charging current value $I_A$ detected by a detection operation that is performed before a current detection operation and a charging current value $I_B$ detected by the current detection operation.

15. The image forming apparatus according to claim 14, wherein in a case where the charging current value $I_B$ is greater than the charging current value $I_A$, the controller controls the speed regulator to decrease the circumferential speed ratio.

16. The image forming apparatus according to claim 15, wherein in a case where the charging current value $I_B$ is greater by a predetermined value or more than the charging current value $I_A$, the controller controls the speed regulator to decrease the circumferential speed ratio.

* * * * *